(12) United States Patent
Ito et al.

(10) Patent No.: US 6,489,730 B2
(45) Date of Patent: Dec. 3, 2002

(54) DISCHARGE-LAMP ILLUMINATION CIRCUIT

(75) Inventors: Masayasu Ito, Shizuoka (JP); Hitoshi Takeda, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/765,198

(22) Filed: Jan. 18, 2001

(65) Prior Publication Data

US 2001/0015625 A1 Aug. 23, 2001

(30) Foreign Application Priority Data

Jan. 20, 2000 (JP) .......................................... 2000-011968

(51) Int. Cl.$^7$ ................................................ G05F 1/00
(52) U.S. Cl. ........................ 315/219; 315/215; 315/217; 315/312
(58) Field of Search ................................. 315/210–217, 315/244, 291, 292–297, 312–324, 240, 219, 308

(56) References Cited

U.S. PATENT DOCUMENTS

| | | | |
|---|---|---|---|
| 4,757,238 A | * | 7/1988 | Rhee ........................... 315/324 |
| 5,142,203 A | | 8/1992 | Oda et al. ..................... 315/308 |
| 5,212,428 A | | 5/1993 | Sasaki et al. ................. 315/308 |
| 5,914,566 A | | 6/1999 | Matsumoto et al. .......... 315/82 |
| 6,023,131 A | * | 2/2000 | Okita ........................... 315/291 |

* cited by examiner

*Primary Examiner*—Don Wong
*Assistant Examiner*—Wilson Lee
(74) *Attorney, Agent, or Firm*—Fish & Richardson P.C.

(57) ABSTRACT

A discharge-lamp illumination circuit has a DC power supply circuit, a DC-AC conversion circuit, and a control circuit for controlling a voltage from the DC power supply circuit. The DC power supply circuit has a transformer and a first switching element connected in series with a primary coil of the transformer. The activation/deactivation of the first switching element is controlled by the control signal from the control circuit. The transformer is equipped with secondary coils equal in number with the discharge lamps. Each secondary coil is equipped with a second switching element whose activation or deactivation is controlled by a signal from the control circuit. The secondary coils provide different voltages by means of control of the second switching elements.

9 Claims, 20 Drawing Sheets

DISCHARGE-LAMP ILLUMINATION CIRCUIT

BACKGROUND OF THE INVENTION

The present invention relates to a technique for generating secondary outputs from a transformer comprising a DC power supply circuit in an illumination circuit, which controls illumination of a plurality of discharge lamps and controls the secondary outputs individually.

A known illumination circuit of a discharge lamp, for example, a metal halide lamp, comprises a DC power supply circuit, a DC-AC converter circuit, and a starter circuit.

The DC power supply circuit has a DC-DC converter, and the DC-AC conversion circuit has a driver circuit and a full-bridge circuit having four semiconductor switching elements, which in pairs controls switching operation. A voltage from a DC-DC converter is supplied to the discharge lamp after being converted into a rectangular-waveform voltage by the full-bridge circuit.

If discharge lamps are used as vehicle headlamps, a circuit to control the lighting of these lamps would be required. A main beam (high beam) lamp and a dipped beam (low beam) lamp are provided in a single headlamp body, which is provided on each side of the front of a vehicle.

If a circuit is provided for each discharge lamp, many individual components, such as DC-DC converters and full-bridge circuits, will be duplicated. This results in increased costs.

To address this problem, a circuit comprising a DC power circuit and a DC-AC conversion circuit may be employed. Along with the DC power supply circuit, two DC-DC converters are provided, each delivering an output of positive and negative polarity. The DC-AC conversion circuit commonly provided to the discharge lamps switches between the outputs of the two DC-DC converters.

For example, if a plurality of secondary coils are provided in a transformer constituting the DC-DC converter, the DC-DC converter can be controlled to make the output voltage of each secondary coil constant. However, variations may exist in lamp voltages of the discharge lamps because of differences in the lamps. Discharge lamp power must be controlled individually according to startup conditions (i.e., cold start or hot start) of each discharge lamp. Neither condition can be addressed by a simple use of a transformer equipped with a plurality of secondary coils.

The present invention provides a low-cost discharge-lamp illumination circuit that controls illumination of a plurality of discharge lamps. The invention is also amenable to miniaturization.

SUMMARY OF THE INVENTION

The present invention provides a discharge-lamp illumination circuit including a DC power supply circuit for providing a DC voltage, a DC-AC conversion circuit for supplying a voltage from the DC conversion circuit to discharge lamps after having converted the voltage into an AC voltage, and a control circuit for controlling the voltage from the DC power supply circuit. Power supplied to the plurality of discharge lamps, respectively, is controlled individually.

Preferably, the DC power supply circuit has a transformer and a first switching element connected to a primary coil of the transformer, and activation/deactivation of the first switching element is controlled by means of a control signal from a control circuit.

Preferably, a secondary coil for each discharge lamp is provided in the transformer of the DC power supply circuit, and a second switching element whose activation or deactivation is controlled by a signal from the control circuit is separately provided on each secondary coil for the secondary coils to output different voltages.

According to the present invention, a plurality of secondary coils comprising a DC power supply circuit are provided. Voltages from the secondary coils can be controlled individually by the second switching elements. The DC power supply circuit is shared among a plurality of discharge lamps, thereby compacting the discharge-lamp illumination circuit and diminishing the costs. Further, the primary energy of the transformer is transferred to the secondary coils by means of activation/deactivation of the second switching elements. Accordingly, distribution of power to the respective discharge lamps can be controlled, thereby individually controling the illumination of the discharge lamps.

DETAILED DESCRIPTION OF THE INVENTION

Figure 1:
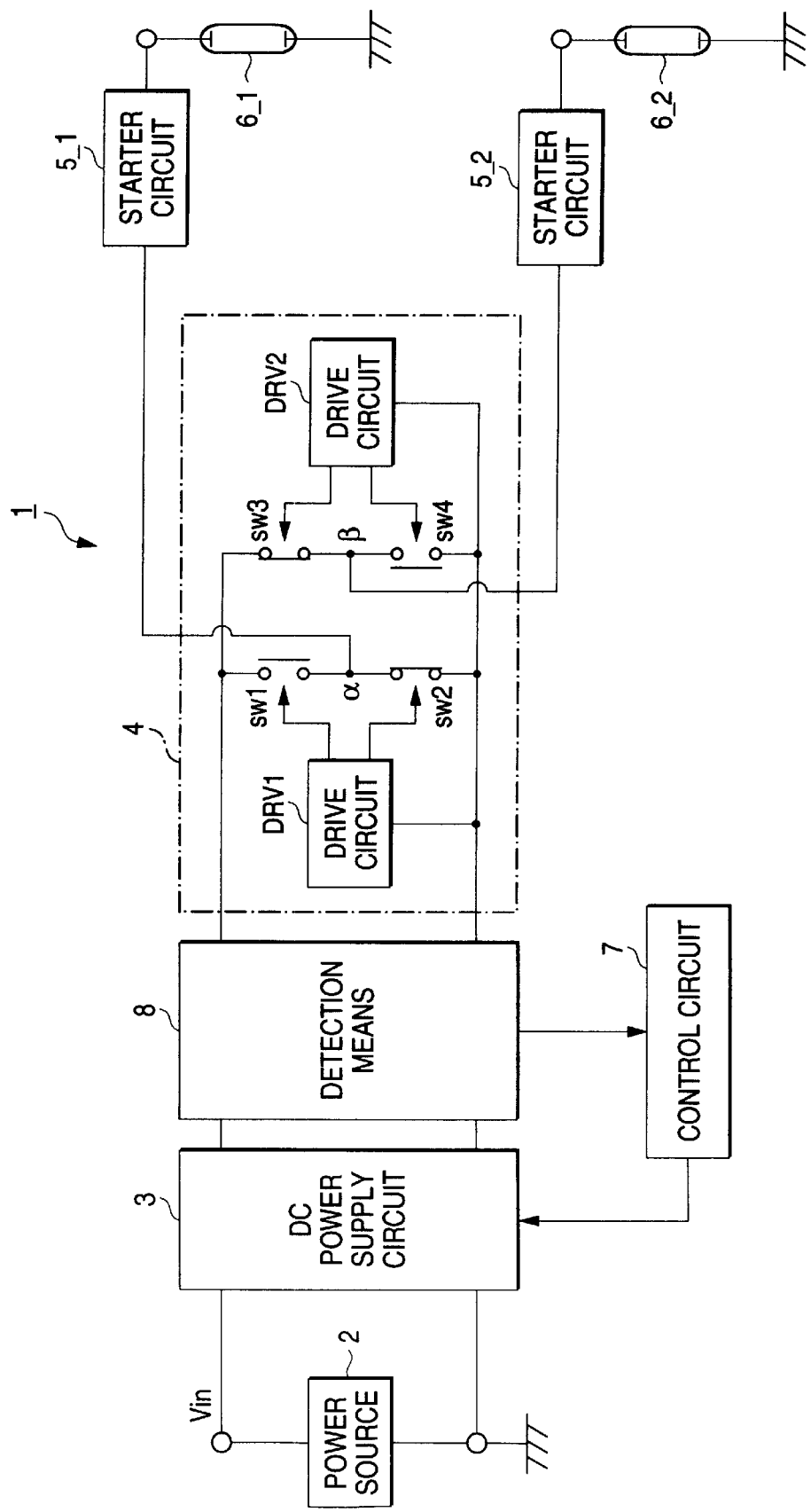
FIG. 1 is an exemplary block diagram of a discharge-lamp illumination circuit according to the present invention.

FIG. 1 shows an exemplary configuration of a discharge-lamp illumination circuit for two discharge lamps according to the present invention.

The discharge-lamp illumination circuit 1 comprises a power source 2, a DC power supply circuit 3, a DC-AC conversion circuit 4, and starter circuits 5_1 and 5_2.

The DC power supply circuit 3 produces a desired DC voltage upon receiving a DC input voltage Vin from the power source 2. The output voltage of the DC power supply circuit 3 is variably controlled in accordance with a control signal from a control circuit described later. A DC-DC converter, for example, a chopper DC-DC converter, and a flyback DC-DC converter having a switching regulator, is included in the DC power supply circuit 3. The DC power supply circuit 3 produces any of the following outputs:

(i) an output of positive polarity (i.e., an output voltage of positive potential relative to the ground potential);

(ii) an output of negative polarity (i.e., an output voltage of negative potential relative to the ground potential); and (iii) outputs of positive and negative polarities.

The basic configuration of the DC-DC converter will be described later.

The DC power supply circuit 3 is connected to the DC-AC conversion circuit 4. The DC-AC conversion circuit 4 comprises a plurality of switching elements for supplying a voltage to each discharge lamp by switching between voltages of different polarity from the DC power supply circuit 3, and a drive circuit for controlling operations of the switching elements. The DC-AC conversion circuit 4 has a full-bridge circuit configuration comprising, for example, four switching elements sw 1, sw 2, sw 3, and sw 4. In FIG. 1, the switching elements, which can be semiconductor switches, are depicted by switch symbols.

Of the four switching elements, the switching elements sw 1 and sw 2 are connected in series to form a first pair. If the DC power supply circuit 3 produces an output of type (iii), one end of the switching element sw1 is connected to an output terminal of positive polarity of the DC power supply circuit 3, and the other end is connected to an output terminal of negative polarity of the DC power supply circuit 3 via the switching element sw 2. A node "a" between the switch elements sw1 and sw2 is connected to a first discharge lamp 6_1 by an inductive load of the starter circuit 5_1.

The switching elements sw 3 and sw 4 are connected in series to form a second pair. If the DC power supply circuit 3 produces an output of type (iii), one end of the switching element sw 3 is connected to the output terminal of positive polarity of the DC power supply circuit 3, and the other end is connected to the output terminal of negative polarity of the DC power supply circuit 3 via the switching element sw 4. A node b between the switch elements sw 3 and sw 4 is connected to a second discharge lamp 6_2 by an inductive load of the starter circuit 5_1.

The remaining terminal of the first discharge lamp 6_1, which is not connected to the node a, is connected to ground, directly or through a current detection resistor. Similarly, the remaining terminal of the second discharge lamp 6_2, which is not connected to the node b, is grounded directly or through a current detection resistor.

An integrated circuit (IC) for a half-bridge driver is used in each of drive circuits DRV1 and DRV2. The driver circuit DRV1 controls activation/deactivation of the switching elements sw 1 and sw 2, and the driver circuit DRV2 controls activation/deactivation of the switching elements sw 3 and sw 4. When the driver circuit DRV1 activates the switching element sw1 and deactivates the switching element sw 2, the driver circuit DRV2 deactivates the switching element sw 3 and activates the switching element sw 4. When the driver circuit DRV 1 deactivates the switching element sw1 and activates the switching element sw 2, the driver circuit DRV2 activates the switching element sw 3 and deactivates the switching element sw 4. Thus, the switching elements sw1 and sw4 are in one state, and the switching elements sw 2 and sw 3 are in another state. The switching element pairs are operated alternately in reverse manners.

If the DC power supply circuit 3 produces an output of type (iii), a voltage of negative polarity (i.e., a negative voltage) is supplied to the second discharge lamp 6_2 when a voltage of positive polarity (i.e., a positive voltage) is supplied to the first discharge lamp 6_1 by activating and deactivating the two switching element pairs. Conversely, a voltage of positive polarity is supplied to the second discharge lamp when a voltage of negative polarity is supplied to the first discharge lamp.

At the initial phase of the illumination, the starter circuits 5_1 and 5_2 provide a startup high-voltage signal (i.e., a startup pulse) to the discharge lamps 6_1 and 6_2 for their activation. The high-voltage signal is superimposed on an AC voltage from the DC-AC conversion circuit 4 while being applied to the discharge lamps 6_1 and 6_2. Each of the starter circuits 5_1 and 5_2 comprises, for example, a transformer, a capacitor attached to a primary circuit of the transformer, and switching elements. The starter circuit may comprise any appropriate circuit elements. When a voltage, which is applied to a capacitor in the starter circuit from the DC power supply circuit 3 or the DC-AC conversion circuit 4, exceeds a threshold value or when the switching elements, for example, self-breakdown type or thyristors, are made to conduct after the voltage has exceeded the threshold value, a pulse in the primary circuit is boosted by the transformer and applied to the discharge lamps from the secondary coils.

The control circuit 7 controls a voltage from the DC power supply circuit 3. It also individually controls the power to be supplied to the discharge lamp 6_1 and the power to be supplied to the discharge lamp 6_2. The control circuit 7 receives one of the following detection signals for illuminating the discharge lamp: 1) a signal resulting from direct detection of a lamp voltage or current of each of the discharge lamps 6_1 and 6_2 through use of a resistor or a coil, and 2) a signal that corresponds to the detection signal and is from detection means 8, which includes a voltage-detection voltage divider or a current detection resistor, for detecting the voltage or current from the DC power circuit 3. In order to perform power control according to the status of the discharge lamp, the control circuit 7 transmits a control signal to the DC power supply circuit 3 in accordance with the detection signal. For example, in an initial phase of illumination, power exceeding the rating is supplied to the discharge lamp for promoting illumination of the lamp. Subsequently, supplied power is gradually decreased, and finally power is controlled to a constant by means of a rated power. The control circuit 7 distributes the power to the discharge lamps by transmitting to the DC power supply circuit 3, a control signal for controlling secondary outputs from the converter transformers provided in the DC power supply circuit 3.

Figure 2:
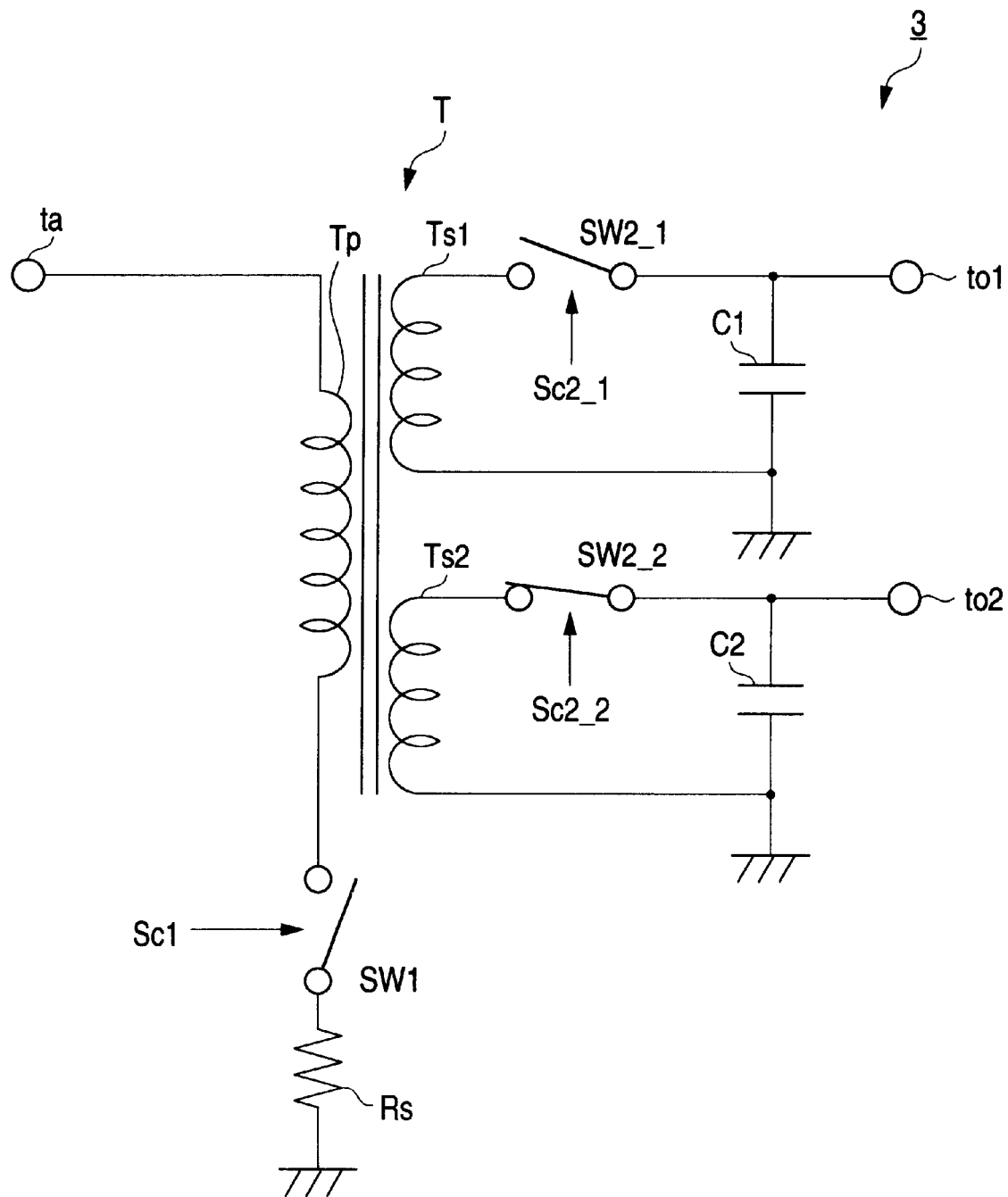
FIG. 2 is an exemplary circuit diagram of a DC power supply circuit.

FIG. 2 shows the basic function of the DC power supply circuit 3 that produces an output of type (i). One terminal of the primary coil Tp of a transformer T is connected to a DC input terminal ta, and the voltage Vin is applied to the terminal. The other terminal of the primary coil Tp is grounded through a semiconductor switching element SW1, which can be, for example, a field-effect transistor and a current detection resistor Rs. A control signal Sc1 from the control circuit 7 is supplied to a control terminal, which can be, for example, a gate electrode in the case of an FET, of the switching element SW1 (the first switching element). By means of the control signal Sc1, activation/deactivation of the first switching element SW1 is controlled.

The transformer T is equipped with secondary coils Ts1 and Ts2, one coil for each discharge lamp. The secondary coils Ts1 and Ts2 comprise smoothing capacitors C1 and C2 and second switching elements SW2_1 and SW2_2, respectively. Here, activation/deactivation of each of the second switching elements SW2_1 and SW2_2 is controlled by a signal from the control circuit 7. Thus, a voltage from the secondary coil Ts1 differs from that from the secondary coil Ts2.

Since two discharge lamps are provided in the vehicle, the transformer T of the example shown in FIG. 2 comprises two secondary coils Ts1 and Ts2. The secondary coil Ts1 is equipped with the switching element SW2_1 and the secondary coil Ts2 is equipped with the switching element SW2_2, SW2_1 and SW2_2 can be a field-effect transistor or a thyristor.

One end of the secondary coil Ts1 is connected to the switching element SW2_1, and the other end is grounded. An output terminal of the switching element SW2_1 is connected to the smoothing capacitor C1. A voltage across the capacitor C1 is output as a voltage through a terminal to1. One end of the secondary coil Ts2 is connected to the switching element SW2_2, and the other end is grounded. An output terminal of the switching element SW2_2 is connected to the smoothing capacitor C2. A voltage across the capacitor C2 is output as a voltage through a terminal to2.

The activation/deactivation of the switching element SW_1 is controlled by a control signal Sc2_1 from the control circuit 7. The activation/deactivation of the switching element SW_2 is controlled by a control signal Sc2_2 from the control circuit 7. A binary status of the switching element SW2_1 is specified by the control signal Sc2_1, and a binary status of the switching element SW2_2 is specified by the control signal Sc2_2.

In the illustrated DC power supply circuit 3 of flyback type, the primary energy of the transformer T is transferred to the secondary circuitry during which the first switching element SW1 remains deactivated. For a DC power supply circuit of forward type, the primary energy is transferred to the secondary circuitry during which the first switching element remains deactivated. When the primary energy is transferred to the secondary circuitry, the control circuit 7 transmits the control signals Sc2_1 and Sc2_2 to the corresponding second switching elements SW2_1 and SW2_2. One of the second switching elements SW2_1 and SW2_2 provided respectively in the secondary coils Ts1 and Ts2 is activated. As a result, the primary energy of the transformer T is supplied from the secondary coil connected to the second switching element to a corresponding discharge lamp during the time the second switching element is activated.

For instance, during the time the switching element SW2_1 is activated, the remaining switching element SW2_2 is deactivated. The switching elements are then controlled to be in the reverse state. That is, the switching element SW2_1 is deactivated, and the switching element SW2_2 is activated. If neither of the switching elements is in an active state during the production of a secondary output from the transformer through the smoothing capacitor, a large voltage may arise between the secondary coils, thereby deteriorating or breaking the switching elements. If both switching elements are activated, primary energy is transferred to the one of the secondary coils that has a smaller potential difference relative to the ground potential.

In the foregoing descriptions, both the secondary coils output voltages of positive polarity. However, the descriptions may also be applied to the DC power supply circuit 3 when the same produces an output of type (ii).

Figure 3:
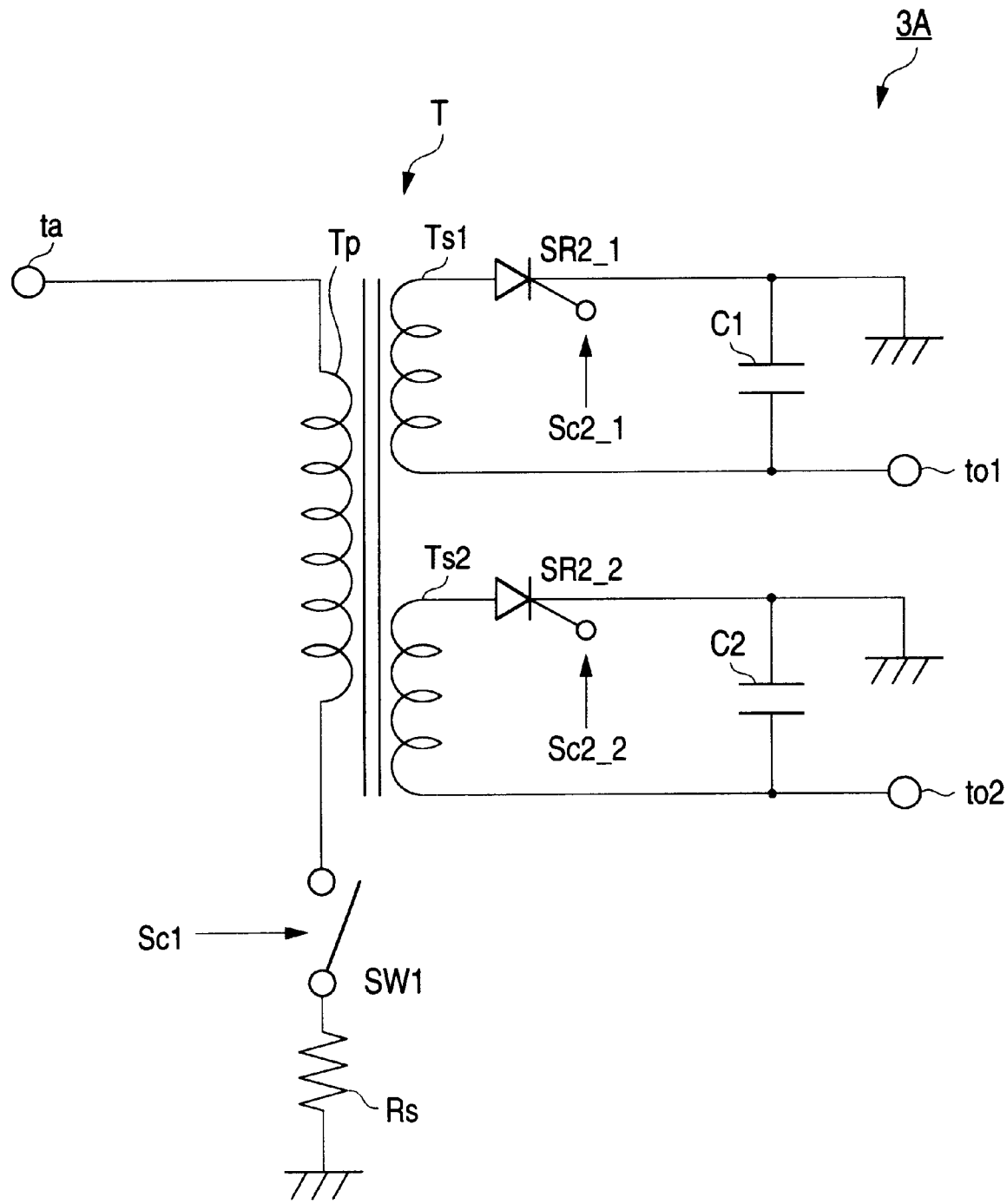
FIG. 3 is an exemplary circuit diagram of the DC power supply circuit using thyristors as second switching elements.

FIG. 3 shows the configuration of such a DC power supply circuit 3A in which a unidirectional three-terminal thyristor is used as a second switching element.

One end of the secondary coil Ts1 is connected to the anode of a thyristor SR2_1, and the other end is connected to the terminal to1. One end of the smoothing capacitor C1 is connected to the cathode of the thyristor SR2_1 and is grounded. The control circuit 7 supplies the control signal Sc2_1 to the gate electrode of the thyristor SR2_1. The secondary coil Ts2 and a thyristor SR2_2 are configured in the same manner. Hence, the above descriptions equivalently apply to the secondary coil Ts2 and the thyristor SR2_2.

In the present circuit, the thyristors act also as rectification elements. The secondary voltages are subjected to half-wave rectification. The rectified voltages are from the respective output terminals as voltages of negative polarity.

Figure 4:
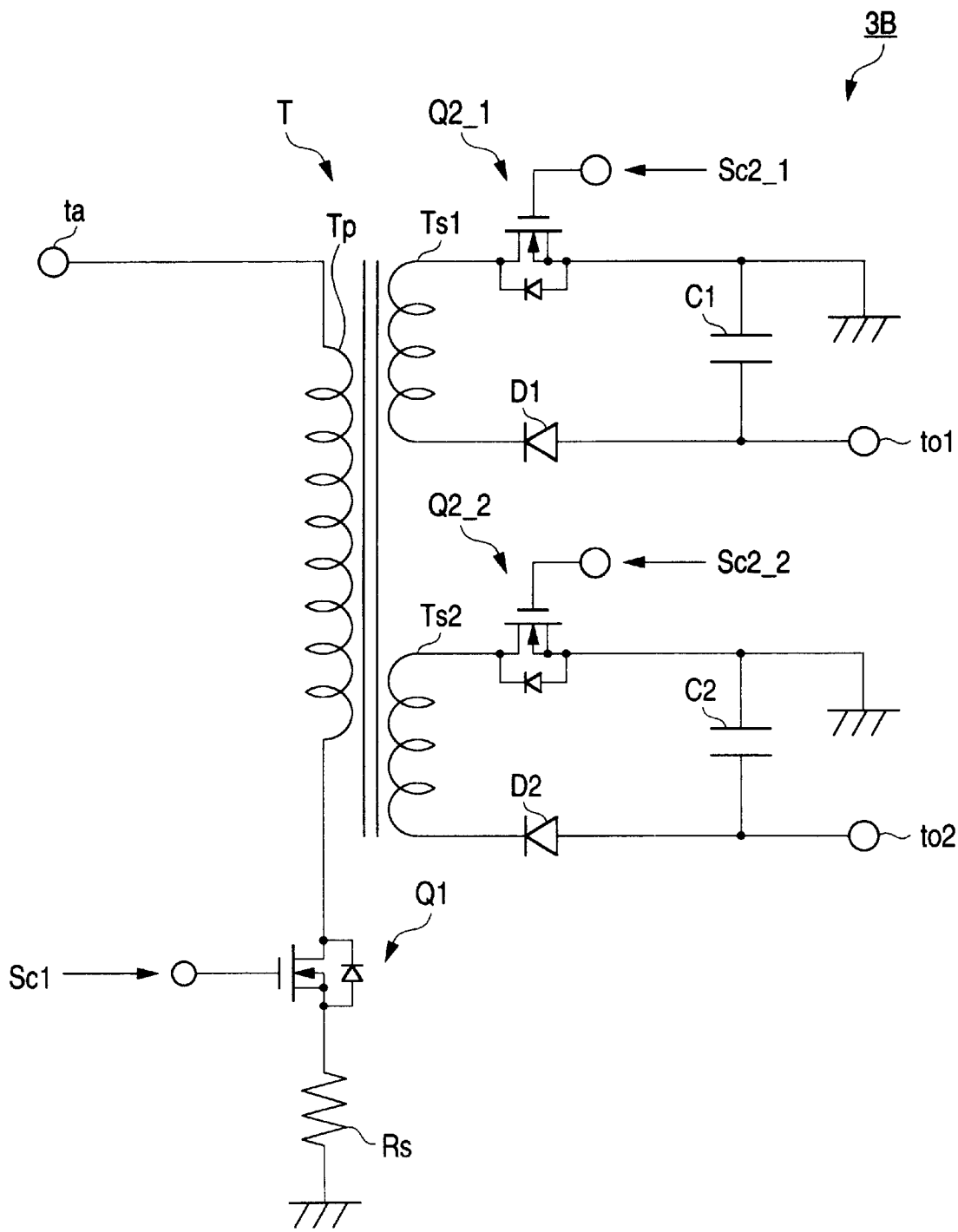
FIG. 4 is an exemplary circuit diagram of a DC power supply circuit using FETs as first and second switching elements.

If the DC power supply circuit uses FETs (Field-Effect Transistors) instead of the thyristors, rectification diodes are added to the power supply circuit in the same manner as in a DC power supply circuit 3B shown in FIG. 4 because an FET possesses a parasitic diode and cannot act as a transistor and a rectification element simultaneously.

The differences between the DC power supply circuit 3A shown in FIG. 3 and the DC power supply circuit 3B shown in FIG. 4 are as follows:

The thyristors SR2_1 and SR2_2 are replaced with FETs FETQ2_1 and FETQ2_2.

The anode of a rectification diode D1 is connected to the output terminal to 1, and the cathode of the same is connected to one end of the secondary coil Ts1 (opposite to the end of the secondary coil Ts1 connected to the FETQ2_1).

The anode of a rectification diode D2 is connected to the output terminal to2, and the cathode of the same is connected to one end of the secondary coil Ts2 (opposite to the end of the secondary coil Ts1 connected to the FETQ2_2).

As illustrated, the FETQ1 is used as a first switching element.

The second switching element SW2_2 provided on the secondary side of the transformer T is set in a high-potential state. However, the present invention is not limited to such a configuration. The second switching element SW2_2 may be set to a low potential state. Thus, in terms of layout and type, the switching elements may be appropriately modified.

Figure 5:
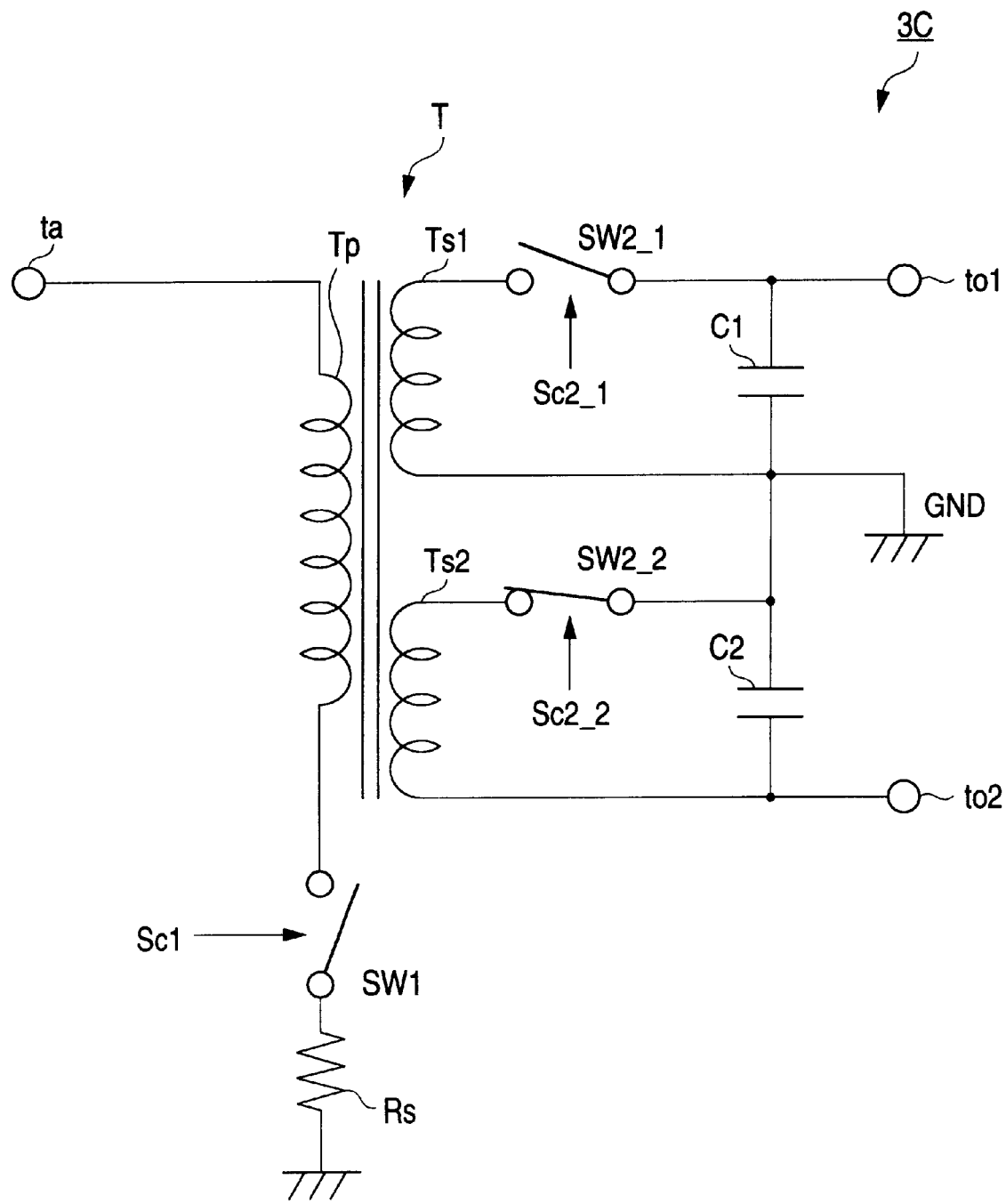
FIG. 5 is an exemplary circuit diagram of a DC power supply circuit producing a secondary output of positive polarity and negative polarity.

A DC power supply circuit 3C that produces an output of type (iii) is shown in FIG.5.

The primary circuit including the primary coil Tp of the transformer T is identical in configuration with that shown in FIG. 2. The first switching element SW1 and the current detection resistor Rs are connected in series with the primary coil Tp. In the secondary circuit of the transformer T, the second switching element SW2_1 is connected to one end of the secondary coil Ts1. The other end of the secondary coil Ts1 is grounded. One end of the smoothing capacitor C1 is connected to the switching element SW2_1, and the other end is grounded. A voltage that corresponds to a voltage across the capacitor C1 and appears at the output terminal to 1 is of positive polarity.

One end of the second switching element SW2_2 is connected to the secondary coil Ts2, and the other end is grounded. One end of the smoothing capacitor C2 is connected to the switching element SW2_2, and the other end is connected to the output terminal to2. A voltage that corresponds to a voltage across the capacitor C2 and appears at the output terminal to2 is of negative polarity.

Figure 6:
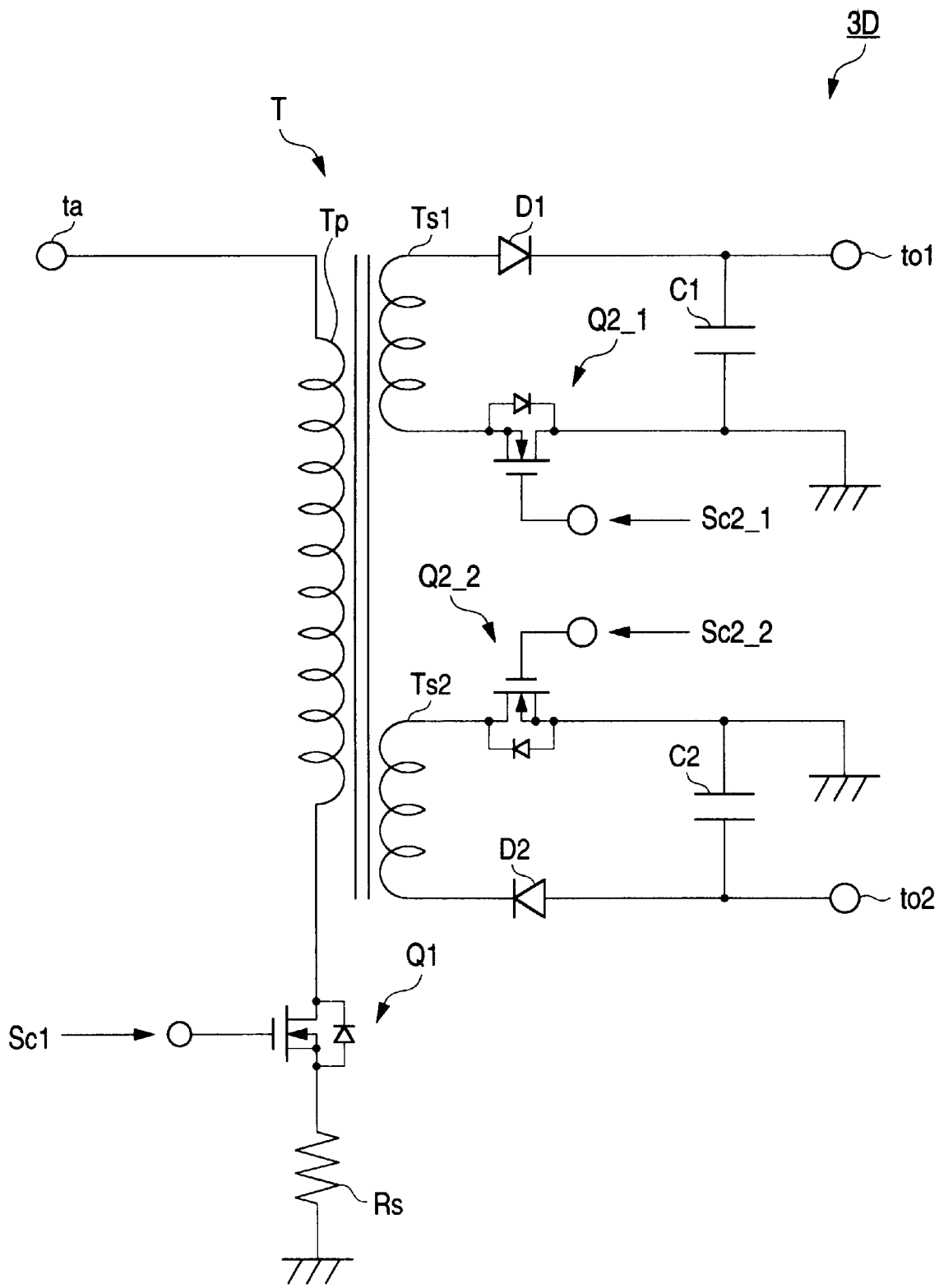
FIG. 6 is an exemplary circuit diagram of a DC power supply circuit using FETs as first and second switching elements.

FIG. 6 shows a DC power supply circuit 3D in which the first and second switching elements are FETs. FETs Q1, Q1_1, and Q1_2 and diodes D1 and D2 are identical in configuration with those used in the circuit shown in FIG. 4, except for the difference in the direction of connection because one secondary output is of positive polarity and the other is of negative polarity.

Figure 7:
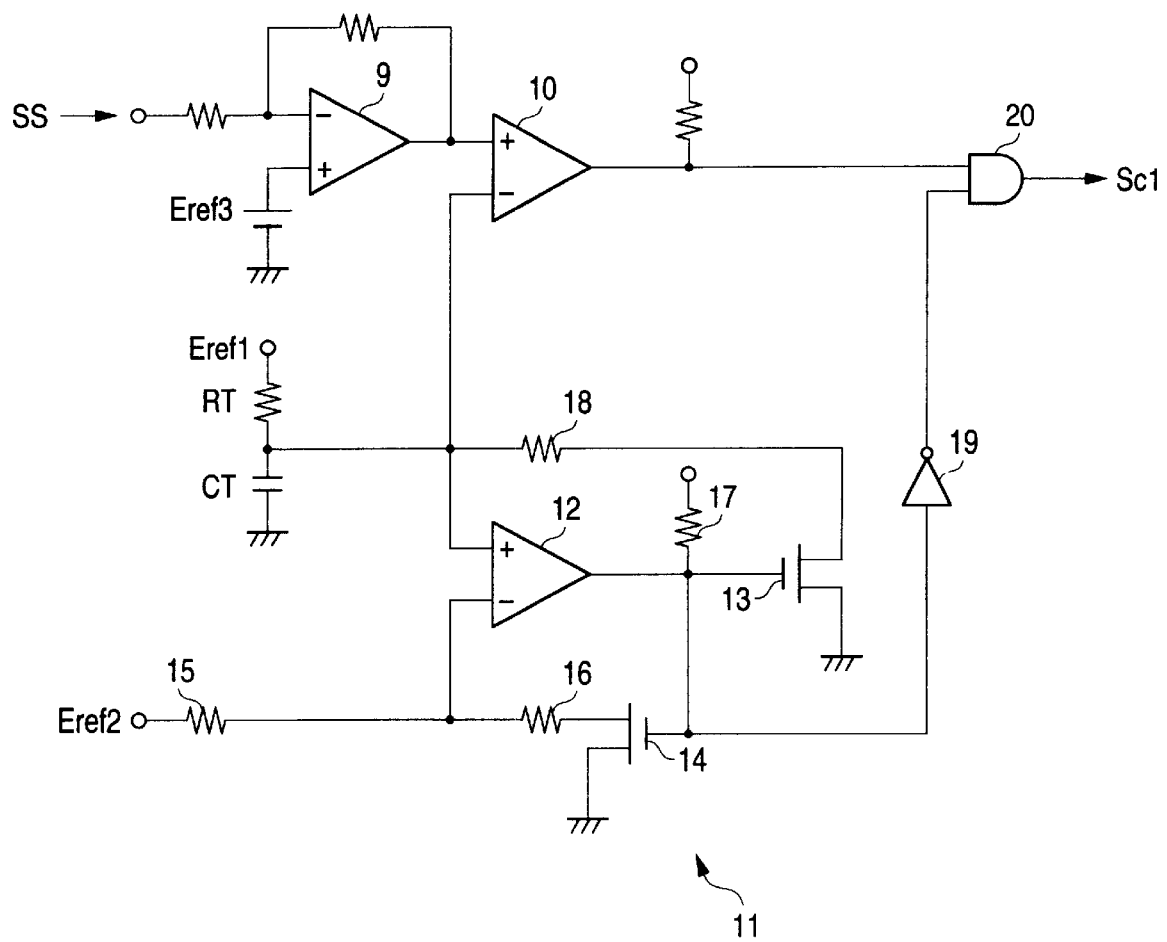
FIG. 7 is an exemplary circuit diagram of a section of a control circuit.

FIG. 7 shows an example of a control circuit adopted to perform a pulse-width modulation (PWM) control method for controlling the DC-DC converter, which comprises the DC power supply circuit (a section of a circuit for controlling a single discharge lamp is illustrated). However, the switching control operation should not be limited to the PWM control method as another suitable control method will be described later.

The PWM control method according to the present invention uses a sawtooth waveform generator for producing a sawtooth waveform. Duty cycle or duty ratio of a signal is determined by cyclic iteration of discharging and recharging operations. The signal is generated by comparing the level of the control signal with the sawtooth waveform. The generated signal is sent to the first switching element.

An operation signal SS is supplied to a negative input terminal of an error amplifier 9, and a predetermined reference voltage Eref3 of a constant-voltage power supply is applied to a positive input terminal of the error amplifier 9. The operation signal SS is produced by subjecting a discharge-lamp-status detection signal (a tube-voltage-detection signal or tube-current-detection signal or a corresponding signal) to various computational operations, such as subtraction or addition, through use of an operational amplifier. Explanations of a signal generation method will be omitted because it is well known in the art.

A signal from the error amplifier 9 is supplied to a positive input terminal of the comparator 10. Further, a sawtooth waveform signal from the sawtooth waveform generation section 11 is supplied to a negative input terminal of the comparator 10. The level of the signal input to the positive input terminal is compared with the level of the sawtooth waveform signal.

The sawtooth waveform generation section 11 comprises a resistor RT, a capacitor CT, a comparator 12, and analog switching elements 13 and 14. The analog switching elements can be a bipolar element or a unipolar element. Signal generation is based on CR oscillation.

A predetermined reference voltage Eref1 is supplied to one end of the resistor RT, and the other end of the resistor RT is grounded through the capacitor CT. The positive input terminal of the comparator 12 is connected to a node between the resistor RT and the capacitor CT. A predetermined reference voltage Eref2 is supplied to the negative input terminal of the comparator 12 through the resistor 15. An output terminal of the comparator is connected to a pull-up resistor 17 and to the analog switching elements 13 and 14.

One of two non-control terminals of the analog switching element 13 is grounded, and the other is connected, via a resistor 18, to a node between the resistor RT and the capacitor CT as well as to the negative input terminal of the comparator 10. One of two non-control input terminals of the analog switching element 14 is grounded, and the other is connected, via a resistor 16, to the negative input terminal of the comparator 12 and the resistor 15.

The signal from the comparator 12 is delivered to a NOT (logical NOT) gate 19.

The comparator 10 is followed by a two-input AND (logical product) gate 20, and the signal from the comparator 10 is supplied to one of the two input terminals of the AND gate 20. The signal from the NOT gate 19 is supplied to the other input terminal. The signal from the AND gate 20 is delivered to the first switching element SW1.

Figure 8:
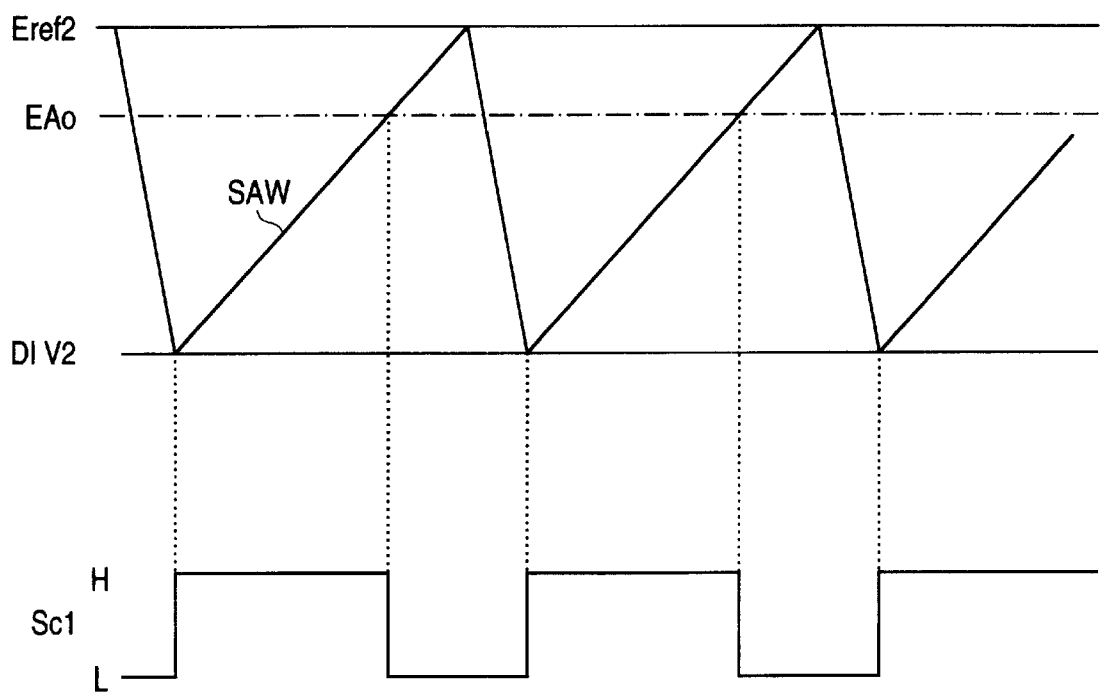
FIG. 8 is an exemplary timing chart for describing the operation of a DC power supply circuit.

FIG. 8 shows the signal waveforms in the sawtooth waveform generation section 11. EAo is the level of the signal from the error amplifier 9 (the level of a real signal fluctuates under the influence of variations in a load. However, the level of the signal is illustrated as a constant value). SAW is the level of a sawtooth waveform. DIV2 is the level of the reference voltage Eref2 after having been divided by the resistors 15 and 16. Sc1 is the level of the signal from the comparator 12 (symbol "H" shown in the drawing depicts a high level, and symbol "L" depicts a low level).

The sawtooth waveform generation section 11 generates a sawtooth waveform by cyclically iterating the charging action of the capacitor CT in association with the resistor RT and the discharging action of the capacitor CT in association with the analog switching element 13 (in an activated state) and the resistor 18. More specifically, the signal from the comparator 12 is held in a low state (L) during the charging period of the capacitor CT. Consequently, the positive input potential is less than the negative input potential, Eref2. Hence, the two analog switching elements 13 and 14 remain deactivated.

Subsequently, when the potential of the terminal of the capacitor CT rises to Erf2, the signal from the comparator 12 becomes high, and the two analog switching elements 13 and 14 are activated. The electric charge stored in the capacitor CT is then discharged through the resistor 18, and a resistive-potential-division level (DIV2)¾, at which the reference voltage Eref2 is divided/¾, is supplied to the negative input terminal of the comparator 12, thereby decreasing the level of the signal from the comparator 12.

When the voltage across the terminals of the capacitor CT drops to the level of DIV 2 as the capacitor CT discharges, the level of the signal from the comparator 12 is switched to low (L), whereby recharging of the capacitor CT is resumed.

Sawtooth waveforms are generated by cyclically iterating the foregoing discharging and recharging operations. The generated sawtooth waveforms are supplied to the negative input terminal of the comparator 12. The frequency of the sawtooth waveform SAW shown in FIG. 8 is determined by such parameters as the resistance of the resistor RT and the electrostatic capacity of the capacitor CT. During the recharging period, the slope of the sawtooth waveform is determined by the resistance of the resistor RT. During the discharging period, the slope of the sawtooth waveform is determined by the resistance of the resistor 18. To make the discharging period shorter than the recharging period, the resistance of the resistor 18 is set to a small value.

The comparator 10 compares the level of the sawtooth waveform SAW with the level of the signal EAo from the error amplifier 9. The duty cycle of the signal Sc1 is determined by the intervals between the intersections of the signal EAo and the sawtooth waveform SAW. As seen in FIG. 8, the signal Sc1 becomes high when the bottom of the sawtooth waveform SAW crosses the resistive-potential-division level DIV2 and becomes low when the sawtooth waveform SAW intersects the signal EAo. The signal Sc1 becomes low when the signal EAo intersects the sawtooth waveform SAW and becomes high when the bottom of the sawtooth waveform SAW crosses the resistive-potential-division level DIV2. When the signal EAo reaches the reference voltage Eref2, the signal from the comparator 12 becomes high. However, when a high-level signal is sent from the comparator 12, a logical NOT signal, that is, the reverse of the high-level signal, is delivered to the AND gate 20. Hence, the duty cycle corresponding to the period during which the capacitor CT discharges through the resistor 18, that is, the low-level period of the signal Sc1, reaches a maximum. In short, the signal from the comparator 12 becomes high when the capacitor CT discharges. Hence, the maximum duty cycle of the signal Sc1 can be set by producing an AND product of the signal from the comparator 12 and the logical NOT signal of the signal from the comparator 12.

In the example shown in FIG. 7, recharging and discharging operations of the capacitor CT are dictated by the use of resistors. However, recharging and discharging operations of the capacitor CT can also be dictated by the use of a constant-current circuit.

Activation/deactivation operations of the second switching element will be described sequentially in reference to the following configurations.

(A) During the course of a single energy transfer induced by the activation/deactivation of the first switching element, the second switching elements are fixed to either an activated or deactivated status. The activated/deactivated statuses of the second switching elements are reversed every time energy is transferred.

(B) During the course of a single energy transfer induced by the activation/deactivation of the first switching element, the second switching elements are fixed to either an activated or deactivated status. The activated/deactivated statuses of the second switching elements are reversed every time energy transfer is effected a predetermined number of times.

(C) During the course of an energy transfer induced by the activation/deactivation of the first switching element, the second switching elements are switched from an activated state to a deactivated state, or vice versa.

(D) During the course of an energy transfer induced by the activation/deactivation of the first switching element, some of the second switching elements are left in an activated state continuously, and the other elements of the second switching elements are switched from an activated state to a deactivated state, or vice versa.

Energy transfer in the basic circuit will be described in reference to a DC power supply circuit that produces an output of type (iii). For example, as shown in FIG. 5, the second switching element SW2_1 is activated, and the second switching element SW2_2 is deactivated. When the first switching element SW1 is deactivated, the primary energy stored¾ during which the first switching element SW is activated¾ is transferred to the secondary coil Ts1 with the second switching element SW2_1 to be activated. The transferred primary energy is then delivered from the terminal to1.

When the second switching element SW2_1 is deactivated, the second switching SW2_2 is activated. During which the first switching element SW1 is deactivated, the primary energy is transferred to the secondary coil Ts2 with the second switching element SW2_2 to be activated. The transferred primary energy is delivered from the terminal to2.

Thus, the primary energy of the converter transformer T is selectively transferred to either the secondary coil Ts1 or Ts2, according to the timing control of the activation and deactivation of the second switching elements SW2_1 and SW2_2. Distribution of energy on the output stage of the converter transformer can be arbitrarily defined by controlling activation and deactivation of the second switching elements.

In configuration (A), when the primary energy is transferred to the secondary circuit in the transformer of the DC power supply circuit, the control circuit transmits control signals to respective second switching elements, such that any one of the second switching elements provided in the secondary coils is activated. During a period in which the second switching element remains activated, the primary energy is supplied to a corresponding discharge lamp from the secondary coil connected to the second switching element. If the DC power supply circuit 3C shown in FIG. 5 is equipped with two discharge lamps and if the second switching element SW2_1 is active when the first switching element SW1 is deactivated, the second switching element SW2_2 is deactivated. Conversely, if the switching element SW2_1 is deactivated, the switching element SW2_2 is activated. Thus, the switching elements are inversely controlled. The two switching elements are mutually activated or deactivated when the loads (e.g., power and voltage) connected to the output stages of the two secondary coils are substantially equal to each other. Accordingly, substantially half the primary energy of the transformer is delivered to each of the discharge lamps.

Figure 9:
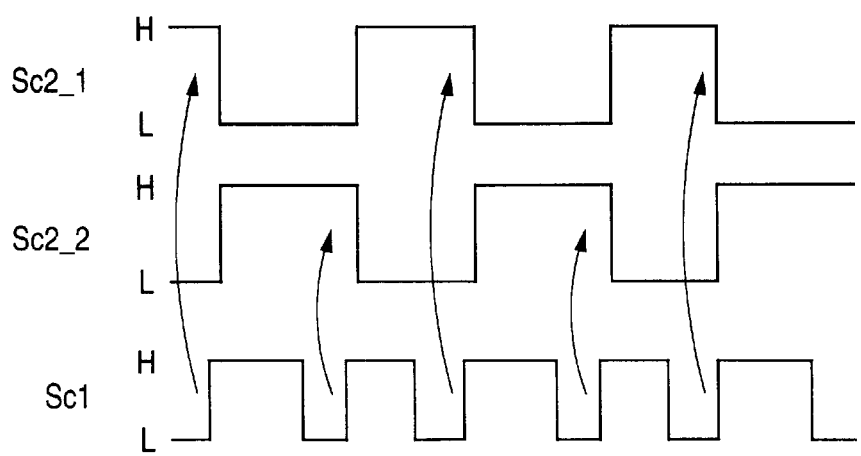
FIG. 9 illustrates an example of control signals to be sent to first and second switching elements.

FIG. 9 is an exemplary timing chart showing control signals supplied from the control circuit to the switching elements. During a period in which the control signal Sc1 to be sent to the first switching element SW1 becomes low, the level of the control signal Sc2_1 becomes opposite to that of the control signal Sc2_2. The statuses of the control signals Sc2_1 and Sc2_2 are changed when the signal Sc1 becomes low, that is, when the control signal Sc2_1 becomes high (low), the control signal Sc2_2 becomes low (high).

Figure 10:
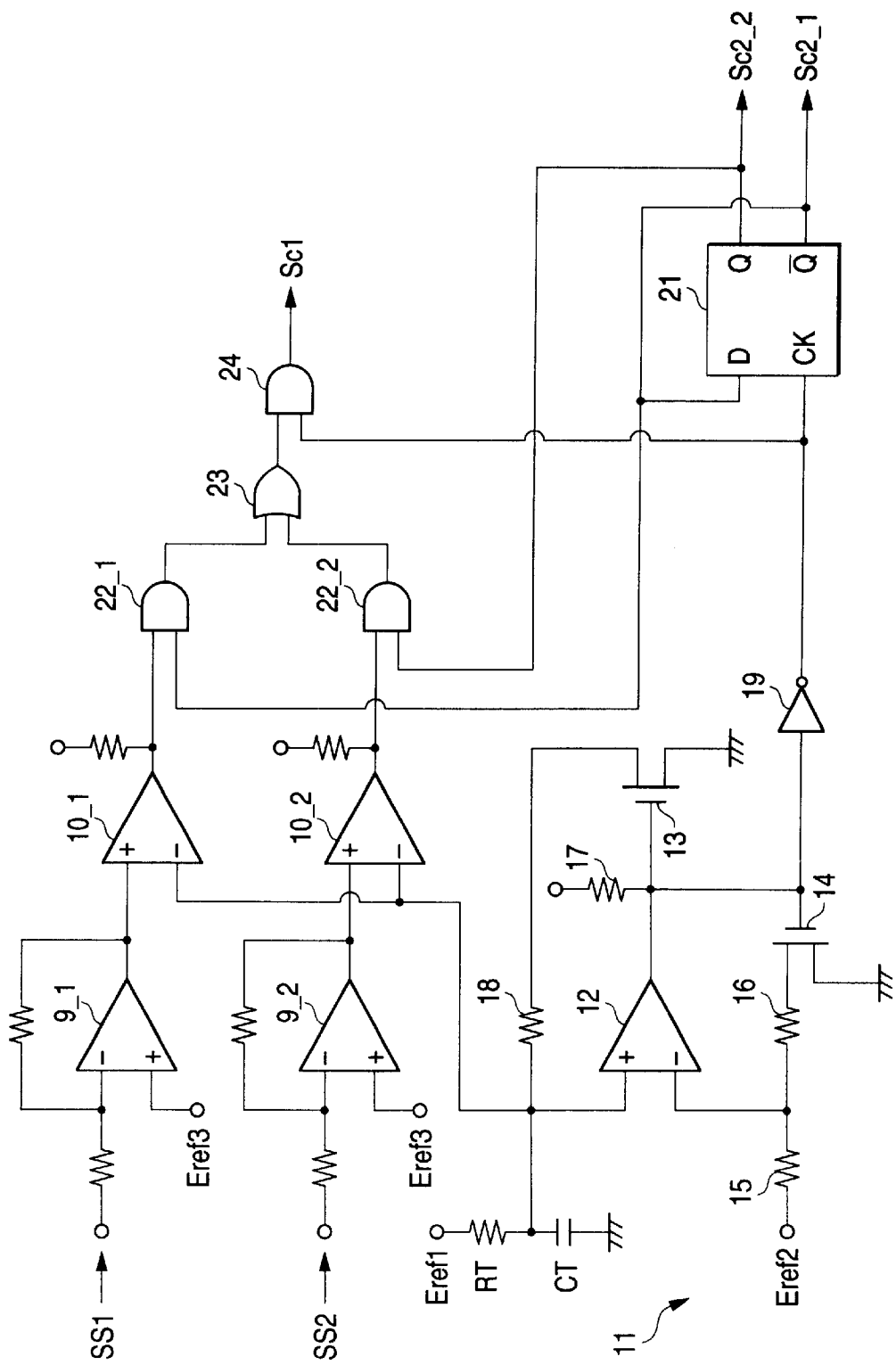
FIG. 10 is an exemplary circuit diagram showing a section of the circuit configuration shown in FIG. 9.

FIG. 10 shows an example of a section of a control circuit according to configuration A. An operation signal SS1 pertaining to the discharge lamp 6_1 and an operation signal SS2 pertaining to the discharge lamp 6_2 are supplied to error amplifiers 9_1 and 9_2, respectively.

The operation signal SS1 is supplied to a negative input terminal of the error amplifier 9_1, and a predetermined reference voltage Eref3 is supplied to a positive input terminal of the same. The signal from the error amplifier 9_1 is sent to a positive input terminal of a subsequent comparator 10_1. Further, the operation signal SS2 is supplied to the negative input terminal of the error amplifier 9_2. The reference voltage Eref3 is supplied to a positive input terminal. The signal from the error amplifier 9_2 is sent to a positive input terminal of a subsequent comparator 10_2.

The sawtooth waveform generation section 11 is identical in configuration with that shown in FIG. 7. A node between the resistor RT and the capacitor CT is connected to a negative input terminal of each of the comparators 10_1 and 10_2. Hence, a sawtooth waveform is entered into the negative input terminals.

The signal from the comparator 12 comprising the sawtooth waveform generation section 11 is delivered to a clock signal input terminal CK of a D flip-flop 21 through a NOT gate 19. A D-input terminal of the flip-flop 21 is connected to a Q-bar output terminal of the flip-flop 21. A signal appearing on the Q-bar output terminal of the flip-flop 21 is the control signal Sc2_1, and a signal appearing on a Q output terminal is the control signal Sc2_2.

The comparator 10_1 is followed by a two-input AND gate 22_1, and the comparator 10_2 is followed by a two-input AND gate 22_2. One of two input terminals of the AND gate 22_1 is connected to the output terminal of the comparator 10_1, and the other input terminal of the same is connected to the Q-bar output terminal of the D-flip-flop 21. One of two input terminals of the AND gate 22_2 is connected to the output terminal of the comparator 10_2, and the other input terminal of the same is connected to the Q output terminal of the D-flip-flop 21.

The signals from the AND gates 22_1 and 22_2 are delivered to a two-input OR (logical OR) gate 23. The signal from the OR gate 23 is delivered to a subsequent two-input AND gate 24. The signal from the comparator 12 of the sawtooth waveform generation section 11 is supplied to the other input terminal of the AND gate 24 through the NOT gate 19. The signal from the AND gate 24 is delivered to the first switching element as the control signal Sc1.

Thus, when the operation signals SS1 and SS2 for the discharge lamps 6_1 and 6_2 are delivered to the respective error amplifiers 9_1 and 9_2, the level of each of the operation signals SS1 and SS2 is compared with that of the reference voltage Eref3. An error detection signal representing a difference between the operation signal SS1 and the reference voltage level Eref3 is delivered to the comparator 10_1, and an error detection signal representing a difference between the operation signal SS2 and the reference voltage level Eref3 is delivered to the comparator 10_2.

As mentioned above, a sawtooth waveform is supplied to the negative input terminals of the comparators 10_1 and 10_2. A binary signal corresponding to the result of comparison between the level of the sawtooth waveform and the level of the signal from the error amplifier 9_1 is delivered to the AND gate 22_1. A binary signal corresponding to the result of comparison between the level of the sawtooth waveform and the level of the signal from the error amplifier 9_2 is delivered to the AND gate 22_2.

The signal from the comparator 12 of the sawtooth waveform generation section 11 becomes high when the capacitor CT discharges. A logical NOT signal of the output signal is delivered to the D-flip-flop 21 as a clock signal and is frequency-divided. The control signal Sc2_1 for activating the second switching element SW2_1 is produced as a Q-bar output of the D-flip-flop 21. The control signal Sc2_2 for activating the second switching element SW2-2 is produced as a Q output of the D-flip-flop 21. These control signals Sc2_1 and Sc2_2 are opposite to each other.

The Q signal from the D-flip-flop 21 is delivered to the AND gate 22_2, and the Q-bar signal from the same is delivered to the AND gate 22_1. The Q-bar signal and the signal from the comparator 10_1 are subjected to an AND operation, and the Q signal and the signal from the comparator 10_2 are subjected to an AND operation. When the Q-bar output signal is high, the signal from the comparator 10_1 is delivered to the OR gate 23. When the Q output signal is high, the signal from the comparator 10_2 is delivered to the OR gate 23. The selection of a signal from the signals from the comparators 10_1 and 10_2 is specified here.

The signals from the comparators 10_1 and 10_2 go through the AND gates 22_1 and 22_2 and the OR gate 23. When the Q-bar signal from the D-flip-flop 21 is high, the signal from the comparator 10_1 is selected. When the Q signal from the D-flip-flop 21 is high, the signal from the comparator 10_2 is selected. Finally, the control signal Sc1 appears on the output terminal of the AND gate 24.

As mentioned above, the D-flip-flop 21 operates in accordance with the signal from the comparator 12. Hence, as the second switching elements SW2_1 and SW2_2 are activated/deactivated alternately, substantially equal energy is transferred to the secondary outputs.

The signal from the comparator 12 is entered into the AND gate 24 through the NOT gate 19. As has been described in connection with the circuit shown in FIG. 7, this specifies the maximum duty cycle of the first switching element SW1.

In configuration (B), different loads are connected to the respective secondary coils of the converter transformer. Each of the second switching elements is fixed to either an activated or deactivated status during a single operation of energy transfer from a primary-side circuit to a secondary-side circuit of the transformer induced by the controlled activation/deactivation of the first switching element. The activated/deactivated statuses of the second switching elements are reversed every time energy transfer is carried out a predetermined number of times. For two discharge lamps with different characteristics, the activated period of one of the second switching elements SW_1 and SW_2 shown in FIG. 5 is longer than that of the other second switching element.

Figure 11:
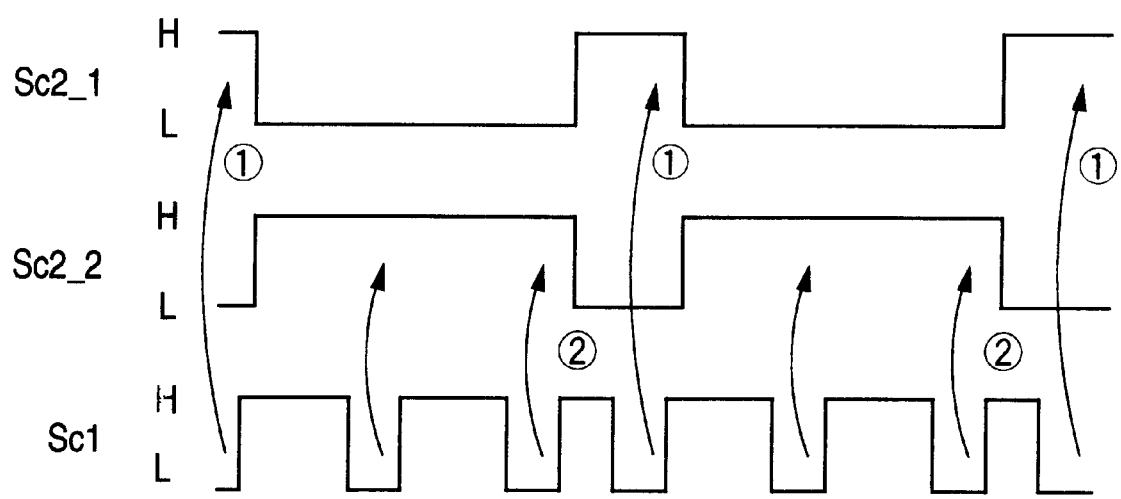
FIG. 11 illustrates another example of control signals to be sent to first and second switching elements.

FIG. 11 is an exemplary timing chart illustrating control signals to be supplied from the control circuit to the first switching element SW1 and the second switching elements SW2_1 and SW2_2, respectively.

The statuses of the second switching elements SW2_1 and SW2_2 are reversed every time the first switching element SW1 is deactivated twice. For instance, when the second switching element SW2_1 is deactivated, the second switching element SW2_2 is activated. The statuses of the second switching elements SW2_1 and SW2_2 are not reversed every time the first switching element SW1 is deactivated. The control signal Sc2_1 to be sent to the second switching element SW2_1 changes from high to low at a timing indicated by arrow (1) shown in FIG. 11. The control signal Sc2_1 changes from low to high at a timing indicated by arrow (2). The control signal Sc2_2 to be sent to the second switching element SW2_2 changes from high to low at a timing indicated by arrow (2) shown in FIG. 11. The control signal Sc2_2 changes from low to high at a timing indicated by arrow (1).

The activated period of the second switching element SW2_2, that is, a high-level period of the control signal Sc2_2, is longer than that of the second switching element SW2_1, that is, a high-level period of the control signal Sc2_1. The secondary coil having the second switching element SW2_2 connected thereto produces an output comparatively more often than does the other secondary coil. As a result, the distribution ratio of the primary energy between the discharge lamps becomes unbalanced. In other words, a greater amount of energy is distributed to a discharge lamp requiring greater power.

Figure 12:
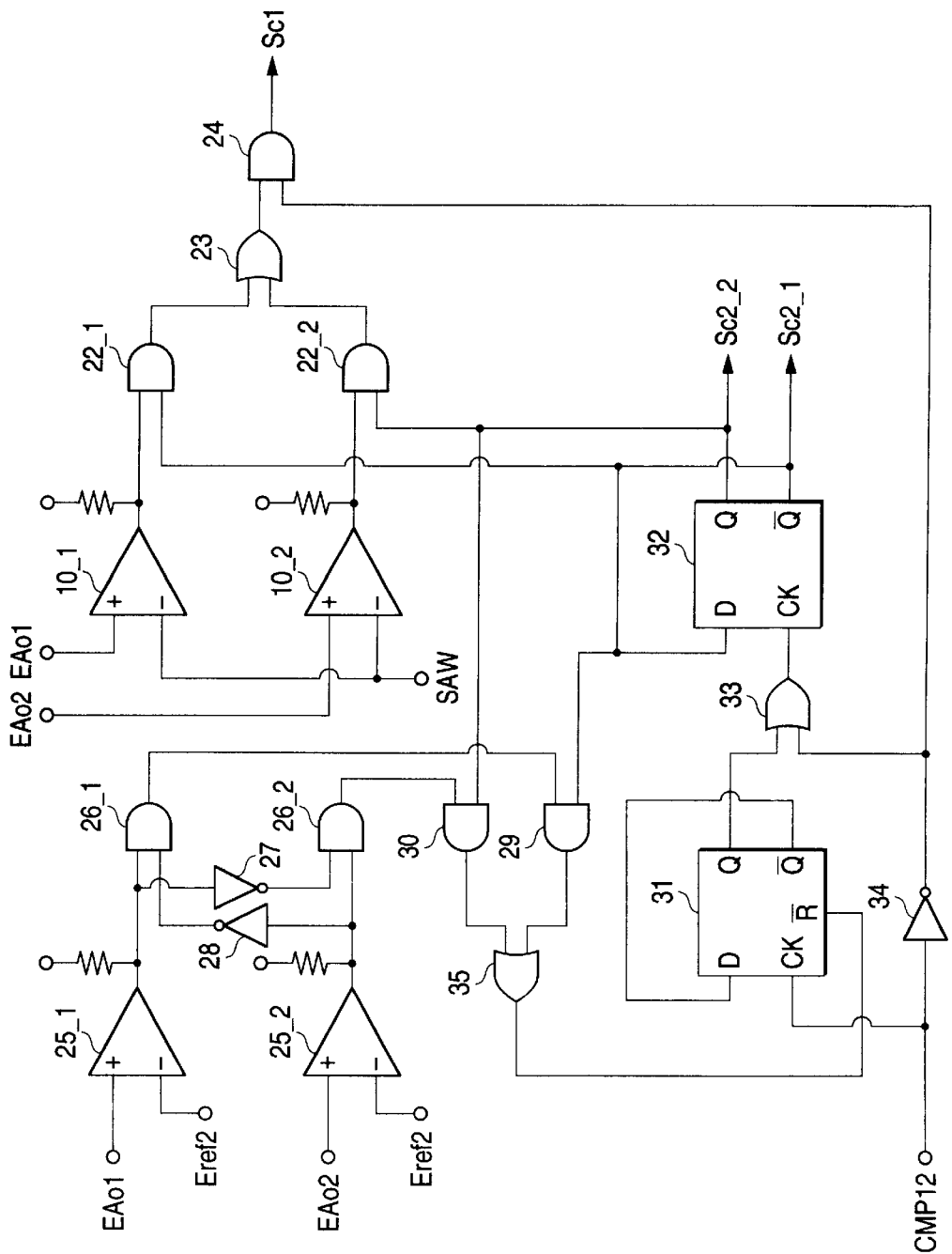
FIG. 12 is an exemplary circuit diagram showing a section of the circuit configuration shown in FIG. 11.

FIG. 12 shows an example of a section of a control circuit according to configuration (B). EAo 1 denotes a signal from the error amplifier 9_1 when the operation signal SS1 concerning illumination control of the discharge lamp 6_1 is entered into the error amplifier 9_1. EAo2 denotes a signal from the error amplifier 9_2 when the operation signal SS2 concerning illumination control of the discharge lamp 6_2 is entered into the error amplifier 9_2.

The signal EAo1 is supplied to the positive input terminal of the comparator 10_1 and a positive input terminal of a comparator 25_1. The signal EAo2 is supplied to the positive input terminal of the comparator 10_2 and a positive input terminal of a comparator 25_2. The comparator 10_1 compares the level of the sawtooth waveform SAW supplied to the negative input terminal of the comparator 10_1 with the level of the signal EAo1. The comparator 25_1 compares the level of the reference voltage Eref2 supplied to the negative input terminal of the comparator 25_1 with the level of the signal EAo1. Similarly, the comparator 10_2 compares the level of the sawtooth waveform SAW supplied to the negative input terminal of the comparator 10_2 with the level of the signal EAo2. The comparator 25_2 compares the level of the reference voltage Eref2 supplied to the negative input terminal of the comparator 25_2 with the level of the signal EAo2. Since the configuration of the sawtooth waveform generation section 11 is identical with those illustrated in FIGS. 7 and 10, further explanation and illustration thereof is omitted.

The signal from the comparator 10_1 is supplied to one of input terminals of the two-input AND gate 22_1. The signal from the comparator 10_2 is supplied to one of input terminals of the subsequent two-input AND gate 22_2.

The signal from the comparator 25_1 is supplied to one of input terminals of a subsequent two-input AND gate 26_1. The signal is supplied further to one of input terminals of a two-input AND gate 26_2 through a NOT gate 27. The signal from the comparator 25_2 is supplied to the other input terminal of the two-input AND gate 26_2. The signal is supplied further to the other input terminal of the two-input AND gate 26_1 through a NOT gate 28.

The signal from the AND gate 26_1 is supplied to one of input terminals of a two-input AND gate 29. The signal from the AND gate 26_2 is supplied to one of input terminals of a two-input AND gate 30.

The D-flip-flop 31 has a low-active input reset terminal Q-bar. A signal from an OR gate 35, described later in greater detail is delivered to the reset terminal. The signal CMP12 from the comparator 12 provided in the sawtooth waveform generation section 11 is delivered to a clock signal input terminal CK of the D flip-flop 31 provided in the preceding stage. A D-input terminal of the flip-flop 31 is connected to the Q-bar output terminal thereof. The signal from the Q output terminal of the flip-flop 31 is delivered to one of two input terminals of a two-input OR gate 33.

The signal CMP12 is supplied to the remaining input terminal of the OR gate 33 through a NOT gate 34. A signal from the OR gate 33 is delivered to a clock signal input terminal CK of the D flip-flop 32. A D input terminal of the flip-flop 32 is connected to a Q-bar output terminal thereof.

A signal from the Q-bar output terminal is supplied to the remaining input terminal of the AND gate 22_1. A signal from the Q output terminal is supplied to the remaining input terminal of the AND gate 22_2. A signal appearing on the Q output terminal of the D-flip-flop 32 is the control signal Sc2_2, and a signal appearing on the Q-bar output terminal is the control signal Sc2_1.

A signal from the AND gate 29 and a signal from the AND gate 30 are delivered to the two-input OR gate 35. The signal from the OR gate 35 is supplied to the reset terminal of the D-flip-flop 31.

The signal from the comparator 10_1 is supplied to one of the input terminals of the two-input AND gate 22_1, and the signal from the Q-bar output terminal of the D-flip-flop 32 is supplied to the remaining input terminal of the AND gate 22_1. The signal from the comparator 10_2 is supplied to one of the input terminals of the two-input AND gate 22_2, and the signal from the Q output terminal of the D-flip-flop 32 is supplied to the remaining input terminal of the AND gate 22_2.

The signals from the AND gates 22_1 and 22_2 are delivered to the two-input OR gate 23, and a signal from the OR gate 23 is supplied to one of the input terminals of the two-input AND gate 24. The signal CMP12 is supplied to the other input terminal of the AND gate 24 through the NOT gate 34, and the signal from the AND gate 24 is the control signal Sc1.

Figure 13:
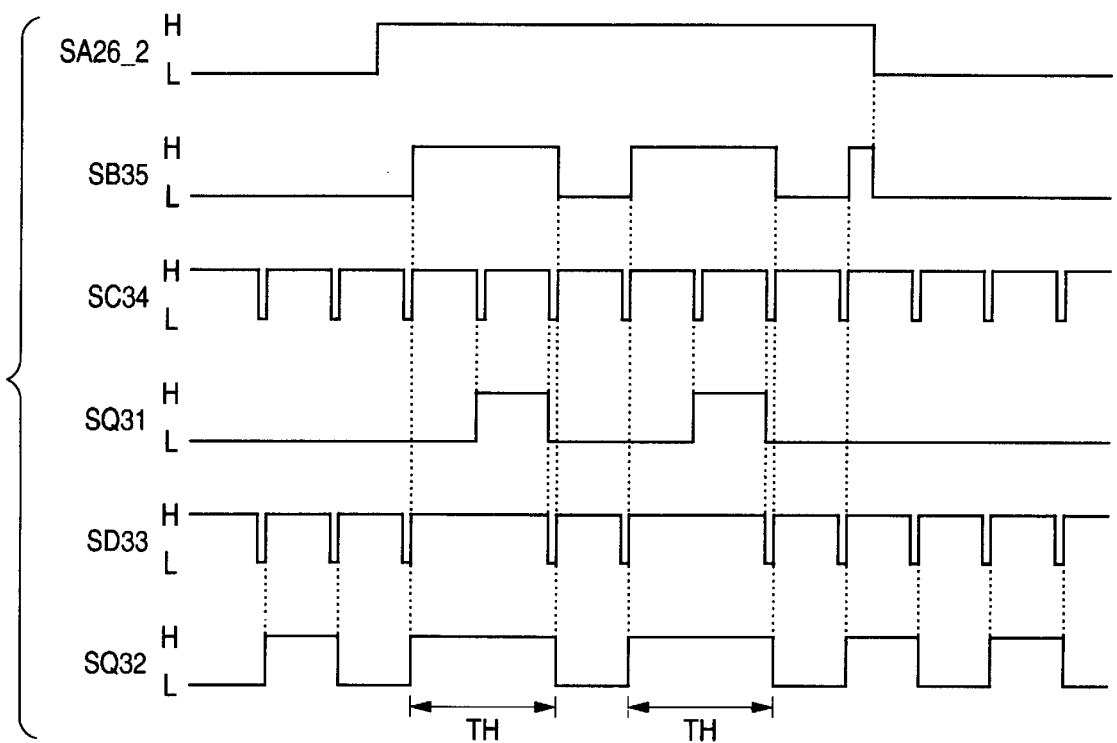
FIG. 13 is an exemplary timing chart for describing the circuit operation of the circuit configuration shown in FIG. 12.

FIG. 13 is an exemplary timing chart showing signals for describing control operations. SA26_2 is a signal from the AND gate 26_2. SB35 is a signal from the OR gate 35. SC34 is a signal from the NOT gate 34. SQ31 is a signal from the terminal Q of the D-flip-flop 31. SD33 is a signal from the OR gate 33. SQ32 is a signal from the terminal Q of the D-flip-flop 32.

The comparator 25_1 compares the signal EAo1 with the reference voltage Eref2 and produces a signal CMP25_1. The comparator 25_2 compares the signal EAo2 with the reference voltage Eref2 and produces a signal CMP25_2. The output signals CMP25_1 and CMP25_2 are produced in the following combinations.

1) CMP25_1=H, CMP25_2=H
2) CMP25_1=H, CMP25_2=L
3) CMP25_1=L, CMP25_2=H
4) CMP25_1=L, CMP25_2=L

In the respective combinations mentioned above, a signal SA26_1 from the AND gate 26_1 and a signal SA26_2 from the AND gate 26_2 assume statuses as described below.

1) SA26_1=L, SA26_2=L
2) SA26_1=H, SA26_2=L
3) SA26_1=L, SA26_2=H
4) SA26_1=L, SA26_2=L

Of the two signals EAo1 and EAo2, a signal greater than the reference voltage Eref2 requires a greater amount of energy supply or otherwise suffers a deficiency of energy supply. The statuses shown in 2) and 3) are detected when any one of the signals from the AND gates 26_1 and 26_2 becomes high. The statuses shown in 1) and 4) show an excess or deficiency of energy supply. The signals SA26_1 and SA26_2 from the AND gates 26_1 and 26_2 are usually in low states and never become high simultaneously. As shown in FIG. 13, when the signal SA26_2 is high, the discharge lamp 6_2 requires a greater amount of power supply.

The AND gate 29 produces an AND product of the signal SA26_1 and the signal from the Q-bar output terminal of the D-flip-flop 32. The AND gate 30 produces an AND product of the signal SA26_2 and the signal from the Q output terminal of the D-flip-flop 32. The OR gate 35 produces an OR product of the signals from the AND gates 29 and 30, thereby yielding a logical-OR signal SB35. The logical-OR signal SB35 is supplied to the reset terminal R-bar. As shown in FIG. 13, when the signal SB35 becomes low, the D-flip-flop 31 does not respond to the signal CMP 12, a clock signal, and the signal SQ31 becomes low. During the high-level period of the signal SB35, the D-flip-flop 31 receives the signal CMP 12, and the polarity of the signal SQ31 is reversed.

A logical OR product of the signal SQ31 and the signal SC34 is supplied to the D-flip-flop 32 as a clock signal. Hence, the signal SD33 is forcefully brought into a high level for a time corresponding to the high-level period of the signal SQ31. Accordingly, the D-flip-flop 32, which operates upon receiving the signal SD33, produces the signal SQ32 such that a high-level period appears in the signal SQ32 for a time period TH that is longer than a pulse width corresponding to the high-level period of the signal SB35. As can be seen from the signals SC34 and SD33, a period corresponding to one cycle is subtracted from the period TH.

The signal SQ32 is the signal Sc2_2, and a reverse signal of the signal Sc2_2 is a signal Sc2_1. A comparison between the duration of the period TH of the signal SQ32 and the duration of the low-level period of the same shows that a greater amount of energy should be supplied to the discharge lamp 6_2.

After the signal SA26_2 has changed from a high level to a low level, the signal SA26_2 assumes status 1) or 4). However, energy is equally supplied to the discharge lamps because the signal SB35 is in a low level and thus the signal SC34 is delivered to the D-flip-flop 32 as a clock signal.

In configuration (C), during a single operation of energy transfer from a primary-side circuit to a secondary-side circuit of the transformer induced by the controlled activation/deactivation of the first switching element, each of the second switching elements is switched to either an activated or deactivated status.

Figure 14:
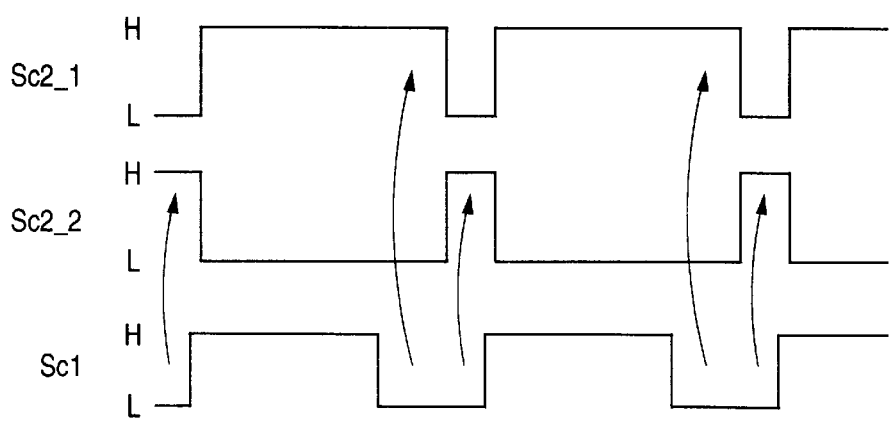
FIG. 14 illustrates yet another example of control signals to be sent to first and second switching elements.

Assume that the DC power supply circuit 3C shown in FIG. 5 is equipped with two discharge lamps, as shown in FIG. 14. The control signal Sc2_1 and the control signal Sc2_2 are switched from high to low when the first switching element SW1 is switched OFF during the low-level period of the signal Sc1. When the control signal Sc1 rises, the statuses of the control signals Sc2_1 and Sc2_2 are reversed.

Similarly, during a low-level period in which the first switching element has entered the next off status, the control signal Sc2_1 is switched from high to low, and the control signal Sc2_2 is switched from low to high. In this way, every time the first switching element enters an off status, the statuses of the second switching elements SW2_1 and SW2_2 are reversed.

Figure 15:
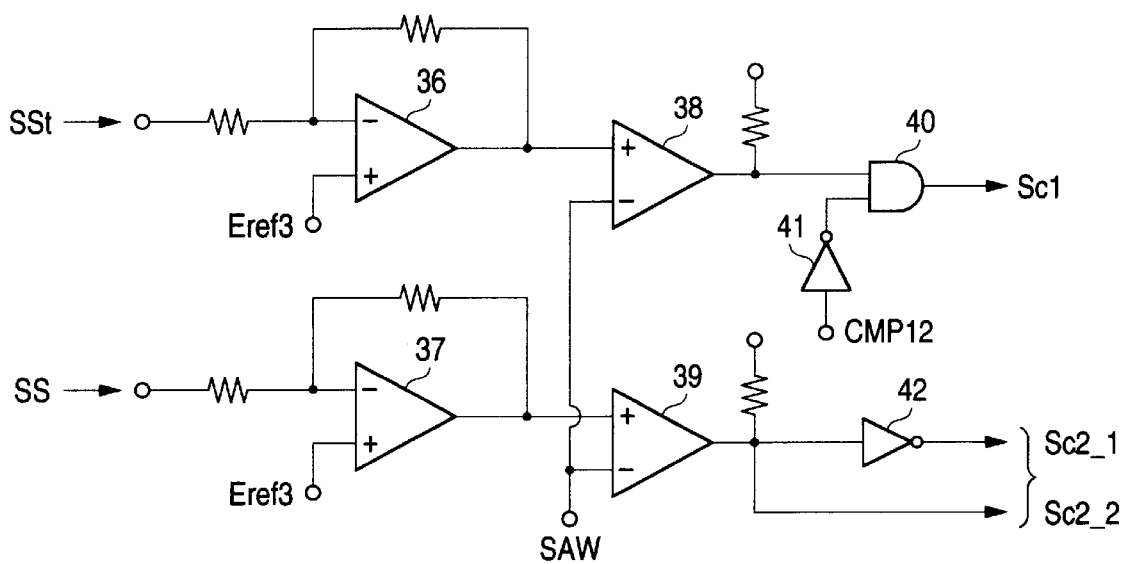
FIG. 15 is an exemplary circuit diagram showing a sawtooth waveform generation section.

FIG. 15 shows an example a section of a control circuit according to configuration (C). Signal SSt is an operation signal associated with power control of the two discharge lamps. The signal controls the total amount of power and is computed from a detection signal that represents the sum of all the secondary outputs from the converter transformer. SS is an operation signal associated with power control of one of the discharge lamps 6_1 and 6_2. The SS signal is computed from a detection signal associated with a secondary output corresponding to the discharge lamp.

The operation signal SSt is supplied to the negative input terminal of an error amplifier 36. The predetermined reference voltage level Eref3 is supplied to a positive input terminal of the error amplifier 36.

The operation signal SS is supplied to a negative input terminal of an error amplifier 37. The predetermined reference voltage level Eref3 is supplied to a positive input terminal of the error amplifier 37.

The error amplifier 36 is followed by a comparator 38, and the error amplifier 37 is followed by a comparator 39. A signal from the error amplifier 36 is entered into a positive input terminal of the comparator 38. A signal from the error amplifier 37 is entered into a positive input terminal of the comparator 39. The sawtooth waveform signal SAW from the sawtooth waveform generation section 11 is supplied to negative input terminals of the comparators 38 and 39. Since the configuration of the sawtooth waveform generation section 11 is identical with those illustrated in FIGS. 7 and 10, further explanation and illustration thereof is omitted.

The signal from the comparator 38 is supplied to one of input terminals of a two input AND gate 40. The signal CMP 12 from the comparator 12 provided in the sawtooth waveform generation section 11 is supplied to the other input terminal of the AND gate 40 through a NOT gate 41. A signal from the AND gate 40 is the control signal sc1 to be delivered to the first switching element SW1.

The signal from the comparator 39 enters a NOT gate 42, and the NOT gate 42 produces a logical NOT product signal (a reverse signal). The logical NOT signal is transmitted to the switching elements as a control signal. For example, assume that the operation signal SS is an operation signal SS1 related to the first discharge lamp 6_1. Then the signal from the comparator 39 is the control signal Sc2_1, and a reverse signal of the control signal Sc2_1 is a control signal Sc2_2.

Figure 16:
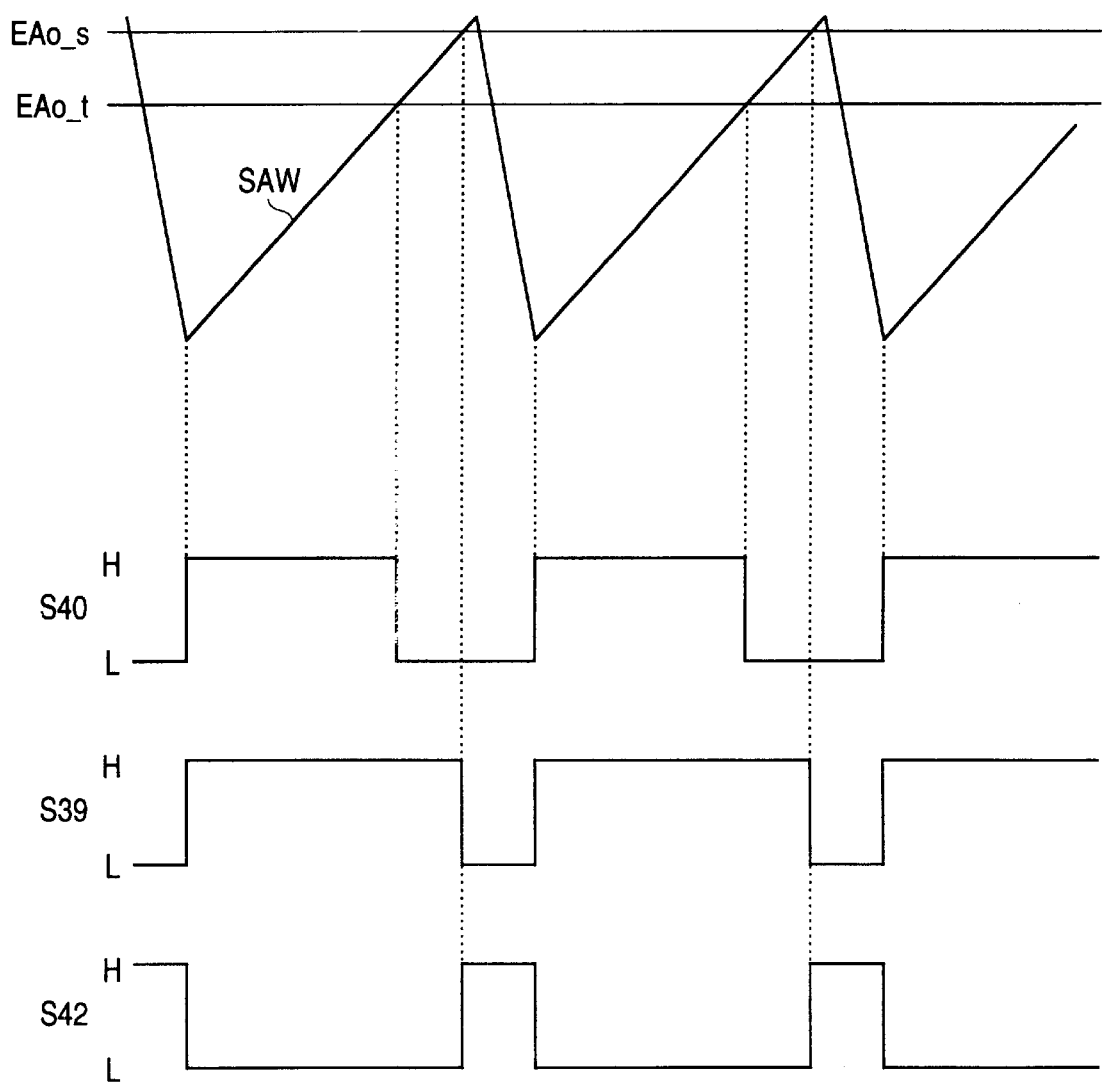
FIG. 16 is an exemplary timing chart for describing the operation of the circuit configuration shown in FIG. 15.

FIG. 16 is an exemplary timing chart showing signals used in the present circuit configuration. EAo_t is the level of a signal from the error amplifier 36. EAo_s is the level of a signal from the error amplifier 37. SAW is the level of a sawtooth waveform. S40 is the level of a signal from the AND gate 40. S39 is the level of a signal from the comparator 39. S42 is the level of a signal from the NOT gate 42.

The S40 signal is defined by comparing the EAo_t signal with the SAW signal. The high-level period of S40 starts when the bottom of the signal SAW appears and ends when the signal SAW exceeds the signal Eao_t. The low-level period of S40 starts when the signal SAW exceeds the signal Eao_t and ends when the bottom of the signal SAW appears.

The S39 signal is defined by comparing the EAo_s signal with the SAW signal. The high-level period of S39 starts when the bottom of the signal SAW appears and ends when the signal SAW exceeds the signal Eao_s. The low-level period of S39 starts when the signal SAW exceeds the signal Eao_s and ends when the bottom of the signal SAW appears.

Since the signal S42 is the reverse of the signal S39, the reciprocal of the above descriptions applies to the signal S42.

In configuration (D), during a single operation of energy transfer from a primary-side circuit to a secondary-side circuit of the transformer induced by the controlled activation/deactivation of the first switching element, some of the second switching elements remain in an activated status, and the other switching elements are switched to either an activated or deactivated status.

Figure 17:
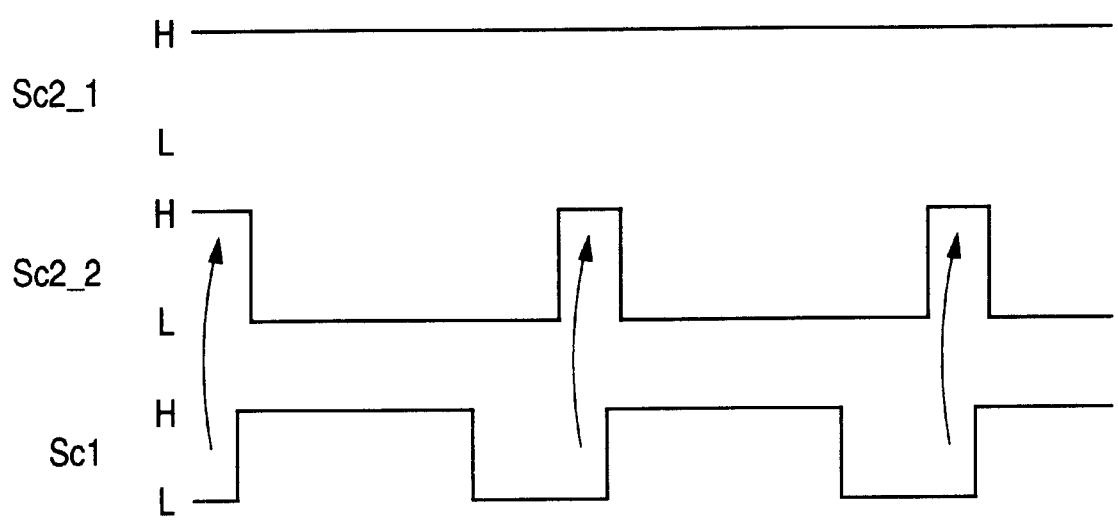
FIG. 17 illustrates still another example of control signals to be sent to first and second switching elements.

Assume that the DC power supply circuit 3C shown in FIG. 5 is equipped with two discharge lamps, as shown in FIG. 17. The control signal Sc2_1 is switched from low to high and the control signal Sc2_2 is switched from high to low when the first switching element SW1 is switched off during the low-level period of the signal Sc1. When the control signal Sc1 rises, the control signal Sc2_1 remains high, and the control signal Sc2_2 is switched from high to low. As mentioned above, every time the first switching element SW1 is turned off, the status of one of the second switching elements SW2_1 and SW2_2 (e.g., the status of the switching element SW2_2 shown in the drawing) is reversed. In this case, the status of the second switching element, which is attached to the secondary coil whose secondary output differs little from the ground potential, is reversed. In contrast, the second switching element that is attached to the secondary coil whose secondary output differs greatly from the ground potential remains activated. The reason for this is that when the two second switching elements SW2_1 and SW2_2 are activated, all the primary energy developed in the converter transformer is transferred to a secondary coil whose secondary output differs little from the ground potential than to a secondary coil whose secondary output differs greatly from the ground potential. To distribute energy to the two secondary coils Ts1 and Ts2, the activation/deactivation of the second switching element, which is attached to the secondary coil whose secondary output differs little from the ground potential, should be controlled.

Figure 18:
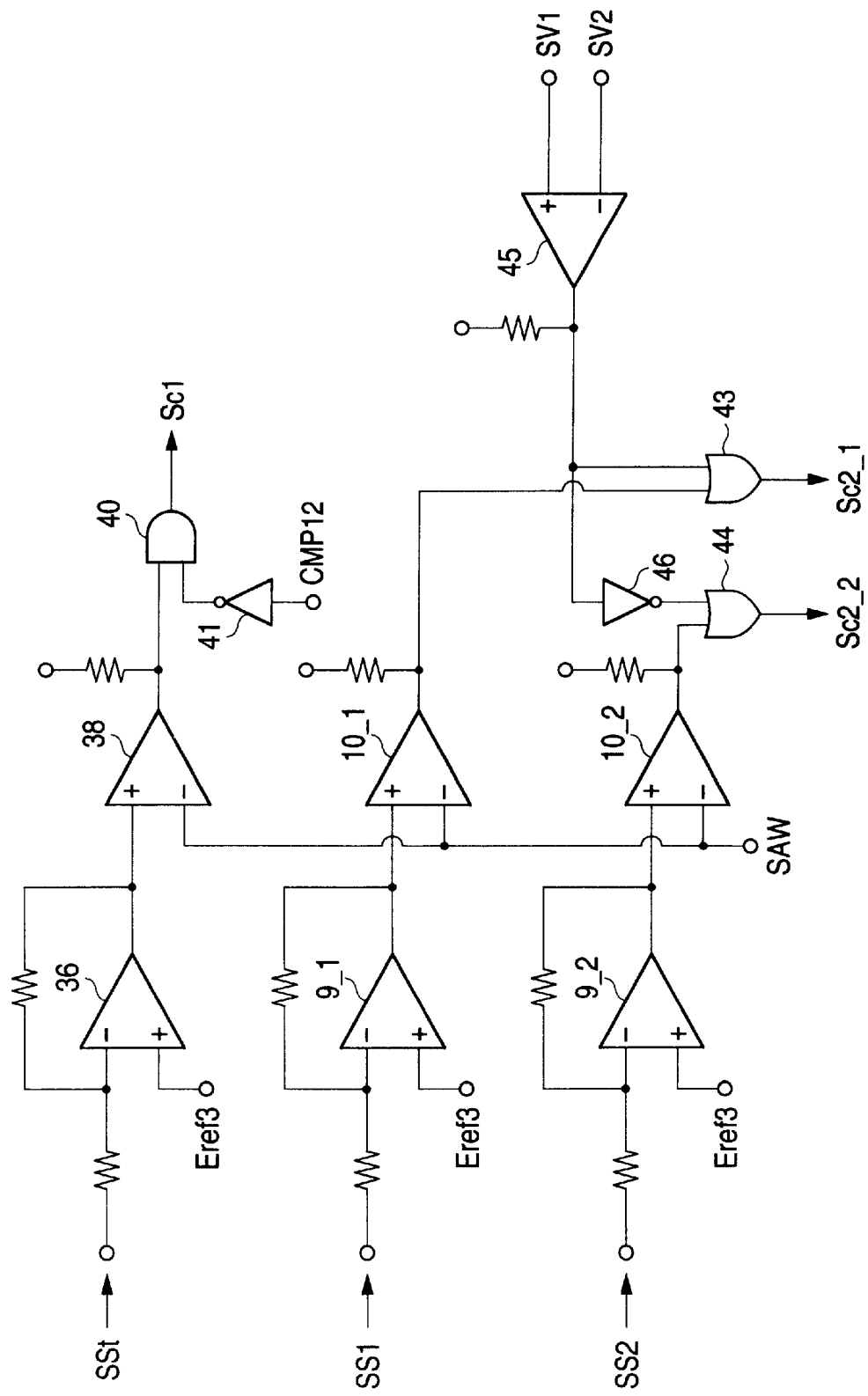
FIG. 18 is an exemplary circuit diagram for carrying out the control operation shown in FIG. 17.

FIG. 18 shows an example of a section of a control circuit according to configuration (D). The error amplifier 36, the comparator 38, the AND gate 40, and the NOT gate 41 have the same configurations as those employed in the circuit configuration shown in FIG. 15, except for the following differences An operation signal SS1 pertaining to power control of one discharge lamp (e.g., 6_1) is entered into the negative input terminal of the error amplifier 9_1.

An operation signal SS2 pertaining to power control of one discharge lamp (e.g., 6_2) is entered into the negative input terminal of the error amplifier 9_2.

Control signals Sc2_1 and Sc2_2 to be delivered to the second switching elements are specified by the signals from the comparators 10_1 and 10_2 and a signal representing the result of comparison between the secondary outputs of the secondary coils of the converter transformer.

The signal from the comparator 10_1 is supplied to one of input terminals of a two-input OR gate 43, and the signal from the comparator 10_2 is supplied to one of input terminals of a two-input OR gate 44. A signal from a comparator 45 is supplied to the remaining input terminals of the OR gates 43 and 44 directly or through a NOT gate 46.

Detection signals represent the voltages from the secondary coils. For example, a detection signal SV1 corresponding to the voltage from the secondary coil Ts1 is supplied to a positive input terminal of the comparator 45. A detection signal SV2 corresponding to the voltage from the secondary coil Ts2 is supplied to a negative input terminal of the comparator 45. A signal from the comparator 45 is delivered to the OR gate 43, as well as to the OR gate 44 through the NOT gate 46.

The signal from the OR gate 43 is the control signal Sc2_1, and the signal from the OR gate 44 is the control signal Sc2_2.

The control signal Sc1 to be sent to the first switching element is produced by logical AND operation of the following two signals.

A signal resulting from comparison between the level of the operation signal SSt delivered to the comparator 38 through the error amplifier 36 and the level of the sawtooth waveform signal SAW.

A signal from the comparator 12 of the sawtooth waveform generation section 11 through the NOT gate 41 (logical NOT signal of the CMP 12).

The operation signal SS1 is entered into the comparator 10_1 through the error amplifier 9_1, and a signal is produced as a result of comparison between the level of the SS1 signal and the level of the sawtooth waveform signal SAW. The control signal Sc2_1 to be sent to the second switching element SW2_1 is produced by a logical OR operation of the produced signal and the signal from the comparator 45.

The operation signal SS2 is entered into the comparator 10_2 through the error amplifier 9_2, and a signal is produced as a result of comparison between the level of the SS2 signal and the level of the sawtooth waveform signal SAW. The control signal Sc2_2 to be sent to the second switching element SW2_2 is produced by a logical OR operation of the produced signal and the logical NOT signal, which is from the NOT gate 46 and originates from the comparator 45.

The comparator 45 compares the detection signal SV1 with the detection signal SV2. If SV1>SV2, the level of the control signal Sc2_1 is brought to high by a high level signal from the comparator 45. Since the signal from the NOT gate 46 is low, the control signal Sc2_2 coincides with the signal from the comparator 10_2. If SV1<SV2 or SV1 £ SV2, the low-level signal from the comparator 45 is reversed, and the reversed signal enters the OR gate 44. The control signal Sc2_2 is brought to high. Since the signal from the comparator 10_1 is entered into the OR gate 43 directly, the control signal Sc2_1 coincides with the signal from the comparator 10_1.

As mentioned above, the comparator 45 determines the potential difference between SV1 and the ground potential and the potential difference between SV2 and the ground potential. The second switching element that controls the secondary output that differs greatly from the ground potential is activated. In contrast, the second switching element that controls the secondary output that differ slittle from the ground potential undergoes switching control operation. Thus, the signals sent to the OR gates are specified. Accordingly, the remaining primary energy that has not been transferred to the secondary output that differs little from the ground potential is transferred to the secondary output that differs greatly from the ground potential.

Configurations (A) through (D) are not limited to isolated use. The configurations can be used in combination or in a switchable manner. For example, if the secondary outputs greatly differ from each other, any one of configurations (B) through (D) can be used. When the secondary outputs differ little from each other and fall within an allowable range of potential difference, the configuration is switched to configuration (A). Thus, configurations can be implemented in various manners.

The foregoing description has stated the configurations for controlling the second switching elements by means of employing the PWM control method. However, the control method is not limited to the PWM control method. For example, the PFM (pulse frequency modulation) control method or any other appropriate method may be employed. Described below is a method for controlling the length of an activated period and the length of a deactivated period when activation/deactivation of the first switching element is controlled. This control method is required when power distribution to discharge lamps cannot be properly controlled by the PWM control method using a single converter transformer.

The control method may be implemented in the following configurations:

(E) A control configuration in which the length of a deactivated period of the first switching element is made constant and the length of an activated period of the same is changed.

(F) A control configuration in which the lengths of activated and deactivated periods of the first switching element are changed.

Figure 19:
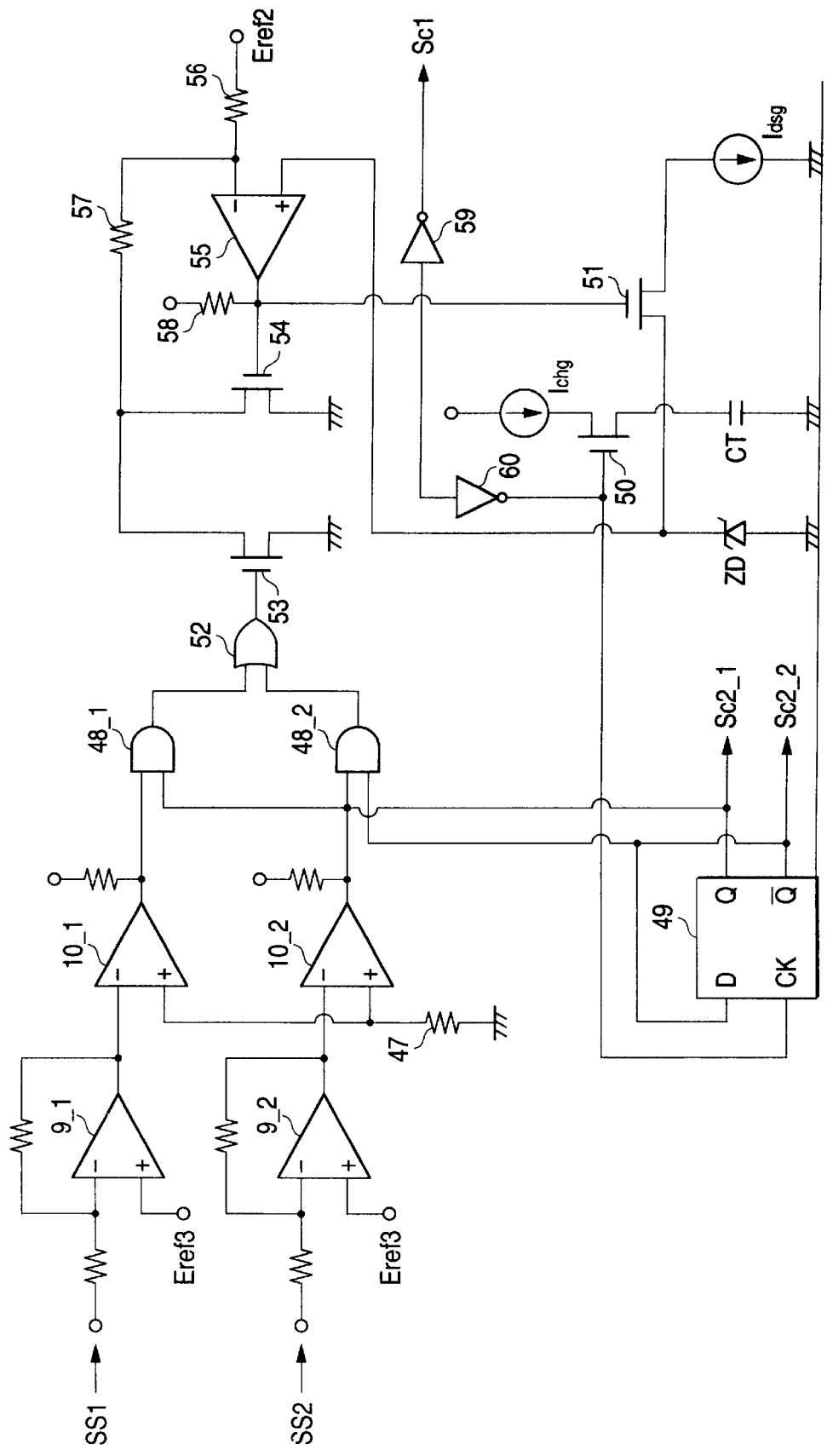
FIG. 19 is an exemplary circuit diagram showing a section of a circuit configuration for controlling activation/deactivation of a first switching element by making a deactivated period of the switching element constant and changing an activated period of the same.

FIG. 19 shows an example of a section of a control circuit according to configuration (E). SS1 and SS2 in the drawing have the same meanings as those mentioned previously.

The signal SS1, for example, is delivered to the negative input terminal of the comparator 10_1 through the error amplifier 9_1. The signal SS2 is delivered to the negative input terminal of the comparator 10_2 through the error amplifier 9_2. The reference voltage Eref3 is delivered to the positive input terminals of the error amplifiers 9_1 and 9_2.

A sawtooth waveform is supplied to the positive input terminals of the comparators 10_1 and 10_2 via a shunt resistor 47. The shunt resistor 47 is connected in series with the first switching element SW1 for detecting the electric current flowing through the first switching element SW1 as a voltage drop in the shunt resistor (see FIGS. 2 through 6).

The signal from the comparator 10_1 is delivered to one of input terminals of a two-input AND gate 48_1, and the signal from the comparator 10_2 is delivered to one of input terminals of a two-input AND gate 48_2. A signal from a D-flip-flop 49 is delivered to each of the remaining input terminals of the AND gates 48_1 and 48_2. More specifically, the signal from a Q terminal of the D-flip-flop 49 is delivered to the AND gate 48_1. A D-input terminal of the D-flip-flop 49 is connected to a Q-bar output terminal of the same, and a signal from the Q-bar output terminal is delivered to the AND gate 48_2. The signal from the Q output terminal is the control signal Sc2_1 to be delivered to the second switching element SW2_1, and the signal from the Q-bar output terminal is the control signal Sc2_2 to be delivered to the second switching element SW2_2.

A constant-current source Ichg for recharging purposes, a constant-current source Idsg for discharging purposes, and analog switching elements 50 and 51 are used for controlling charging-and-recharging operations of the capacitor CT. One end of the capacitor CT is connected to the constant-current source Ichg through the analog switching element 50, and the other end of the capacitor CT is grounded. A node between the capacitor CT and the analog switching element 50 is connected to the constant-current source Idsg through the analog switching element 51. Further, the node is grounded through a clamping Zener diode ZD.

The signal from the AND gate 48_1 is delivered to one of input terminals of a two-input OR gate 52, and a signal from the AND gate 48_2 is delivered to the other input terminal of the two-input OR gate 52. A signal from the OR gate 52 is supplied to a control terminal of an analog switching element 53, thereby specifying the activation/deactivation of the analog switching element 53.

Activation/deactivation of an analog switching element 54 connected in parallel with the analog switching element 53 is specified by a signal supplied from a comparator 55 to a control terminal of the analog switching element 54.

The reference voltage Eref2 is supplied to the negative input terminal of the comparator 55 through a resistor 56. The negative input terminal of the comparator 55 is connected to a node between a non-control terminal of the analog switching element 53 and a non-control terminal of the analog switching element 54. The remaining non-control terminals of the analog switching elements 53 and 54 are grounded.

A signal from the comparator 55 is connected to a predetermined power supply terminal through a resistor 58, as well as to control terminals of the analog switching elements 51 and 54 and input terminals of NOT gates 59 and 60.

A signal from the NOT gate 59 is delivered as the control signal Sc1 to the first switching element SW1. A signal from the NOT gate 60 is supplied to a control terminal of the analog switching element 50 and a clock signal input terminal CK of the D-flip-flop 49.

Figure 20:
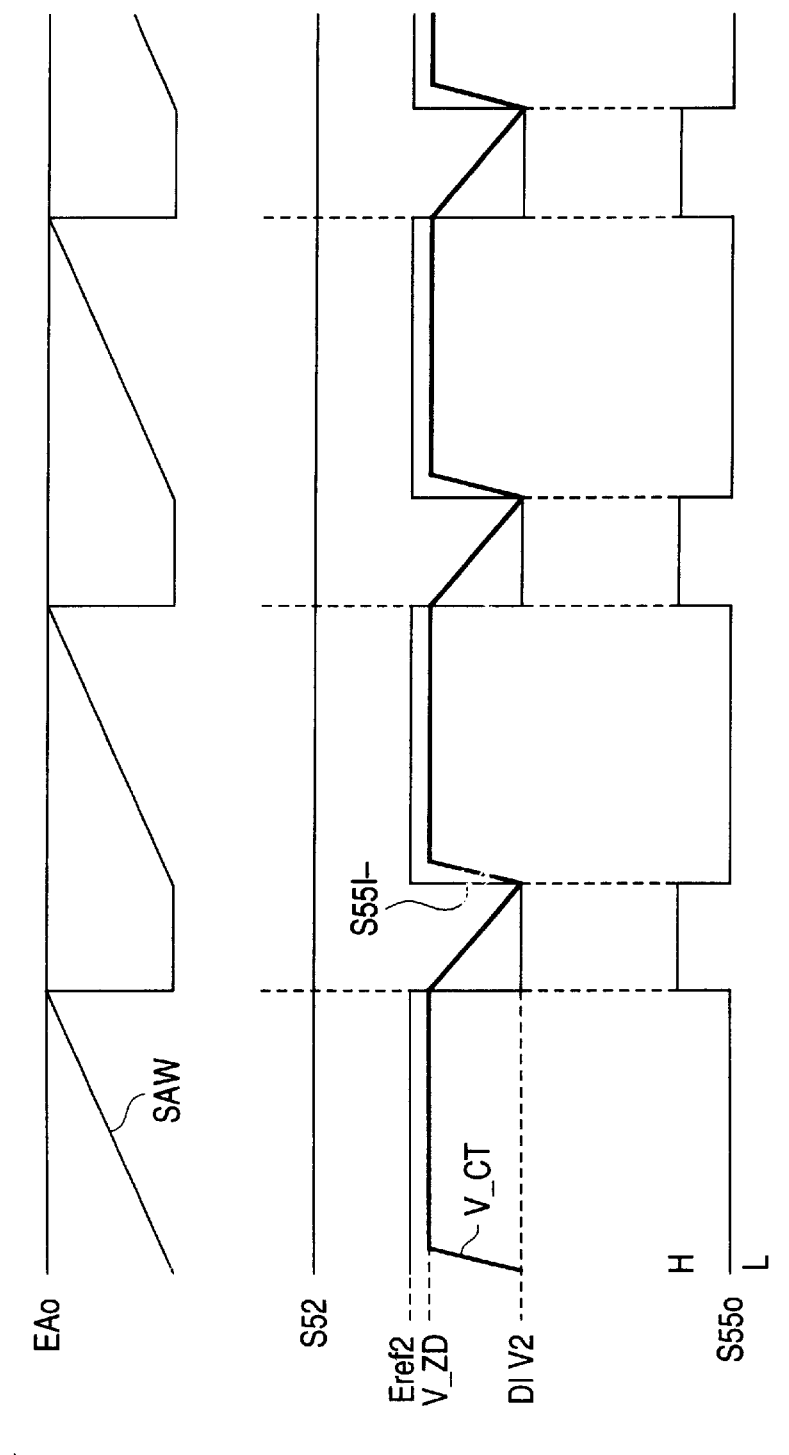
FIG. 20 is an exemplary timing chart for describing the circuit operation of the circuit configuration shown in FIG. 19.

FIG. 20 shows the principal signals employed in the present circuit configuration. Eao is the level of a signal sent from one of the error amplifiers 9_1 and 9_2. In reality, the level of the signal fluctuates under the influence of variations in loads. The level of the output signal is illustrated as a constant value. SAW is the level of a sawtooth waveform signal applied to the shunt resistor 47. S52 is the level of a signal from the OR gate 52. V_CT is the terminal potential of the capacitor CT. V_ZD is the level of a Zener voltage (smaller than the reference voltage Eref2). S55I is the potential of the negative input terminal of the comparator 55. DIV2 is a level at which the reference voltage Eref2 is divided by the resistors 56 and 57. S55o is the level of a signal from the comparator 55.

The output level EA0 of the error amplifier 9_1 or 9_2 is compared with the level of the sawtooth waveform signal for one of the operation signals SS1 and SS2. Such comparison is carried out for the remaining operation signal.

The signal from the comparator 10_1 is entered into the OR gate 52 through the AND gate 48_1, and the signal form the comparator 10_2 is entered into the OR gate 52 through the AND gate 48_2. As shown in FIG. 20, the signal S52 is a pulse signal that becomes high when the SAW signal reaches the level of EAo.

When EAo>SAW, S55I- becomes equal to Erf2. Since V_CT is smaller than Eref2, S55o becomes low. When S52 becomes high, the analog switching element 53 is activated, whereupon the S55I-level drops to DIV2. Hence, S55o becomes high, and the analog switching elements 51 and 54 are actuated. The capacitor CT is discharged, so that V_CT gradually decreases. When V_CT reaches DIV2, S55o becomes low. As a result, the analog switching elements 51 and 54 are deactivated and S55I- returns to Eref2. Then, the analog switching element 50 is activated. After the capacitor CT is recharged, V_CT reaches V_ZD.

The control signal Sc1 to be sent to the first switching element SW1 is produced by the NOT gate 59 as a logical NOT signal of S55o. The length of the high-level period of the control signal Sc1 is specified by the relationship between EAo and SAW, and the length of the low-level period of the same is defined by the discharging period of the capacitor CT. The current of the recharging constant-current source Ichg is set to a large value. V_CT immediately reaches V_ZD during a recharging period. In contrast, the current of the constant-current source Idsg is set to a small value. V_CT drops from a clamp potential V_ZD to DIV2 during a discharge period. The discharge period assures that the low-level period has a given period of time. The aforementioned operations are explained in detail as follows:

1) When SAW>EAo, the signal from the comparator 10_1 (or 10_1) becomes high.
2) When SS5I- of the comparator 55 drops to DIV2 and when S55o becomes high, discharging of the capacitor CT is started. At this time, the first switching element SW1 is deactivated, the shunt resistor 47 detects a zero current, and the signal from the comparator 10_1 (or 10_2) becomes low. The analog switching element 53 is deactivated.

3) When V_CT drops to DIV2, S55o becomes low, and S551- returns to Eref2, whereby the first switching element SW1 is activated. At this time, the clock signal entered into the D-flip-flop 49 becomes high, and the output signal of the D-flip-flop 49 is reversed. The second switching element is switched between an activated state and a deactivated state, thereby switching between secondary outputs to which primary energy is to be transferred.

4) Recharging of the capacitor CT is started by the analog switching element 50, whereby V_CT immediately reaches V_ZD. Further, the electric current flowing through the first switching element SW1 gradually increases depending on the inductance of the primary coil of the converter transformer T. SAW gradually increases, and the control circuit returns to status 1.

Since the signal S55o is sent to the clock signal input terminal of the D flip-flop 49 through the NOT gate 50, the control signals Sc2_1 and Sc2_2 to be sent to the second switching elements SW2_1 and SW2_2 are produced by frequency-division of the signal S55o and are out of phase with each other.

In the circuit configuration shown in FIG. 19, a Zener diode is used for clamping signal V_CT. However, a buffer clamp using a reference voltage may be used in place of the Zener diode. The requirements for selecting a clamp are that a clamp voltage be set to a value smaller than the reference voltage Eref2 and that the timing at which S55o becomes high is set to a timing at which S52 becomes high.

Provided that the electrostatic capacitance of the capacitor CT is taken as CT, a low-level period of the control signal Sc1, that is, an off-period of the first switching element, is given as (V_ZD-DIV2)×CT/Idsg. The circuit is controlled such that, as the voltage level EAo becomes higher, the high-level period of the control signal Sc1, that is, the activated period of the first switching element SW1, becomes longer.

Configuration (F) is described below. To control the high-level period and low-level period of the control signal Sc1 or the activated period and deactivated period of the first switching element SW1, only slight modification of the circuit configuration shown in FIG. 19 is required. Instead of the signal delivered through the shunt resistor 47, the voltage across the capacitor CT is supplied to the negative input terminals of the comparators 10_1 and 10_2 as a sawtooth waveform signal. The Zener diode ZD is removed from the circuit, and the current of the recharging constant-current source Ichg is set to a small value.

Figure 21:
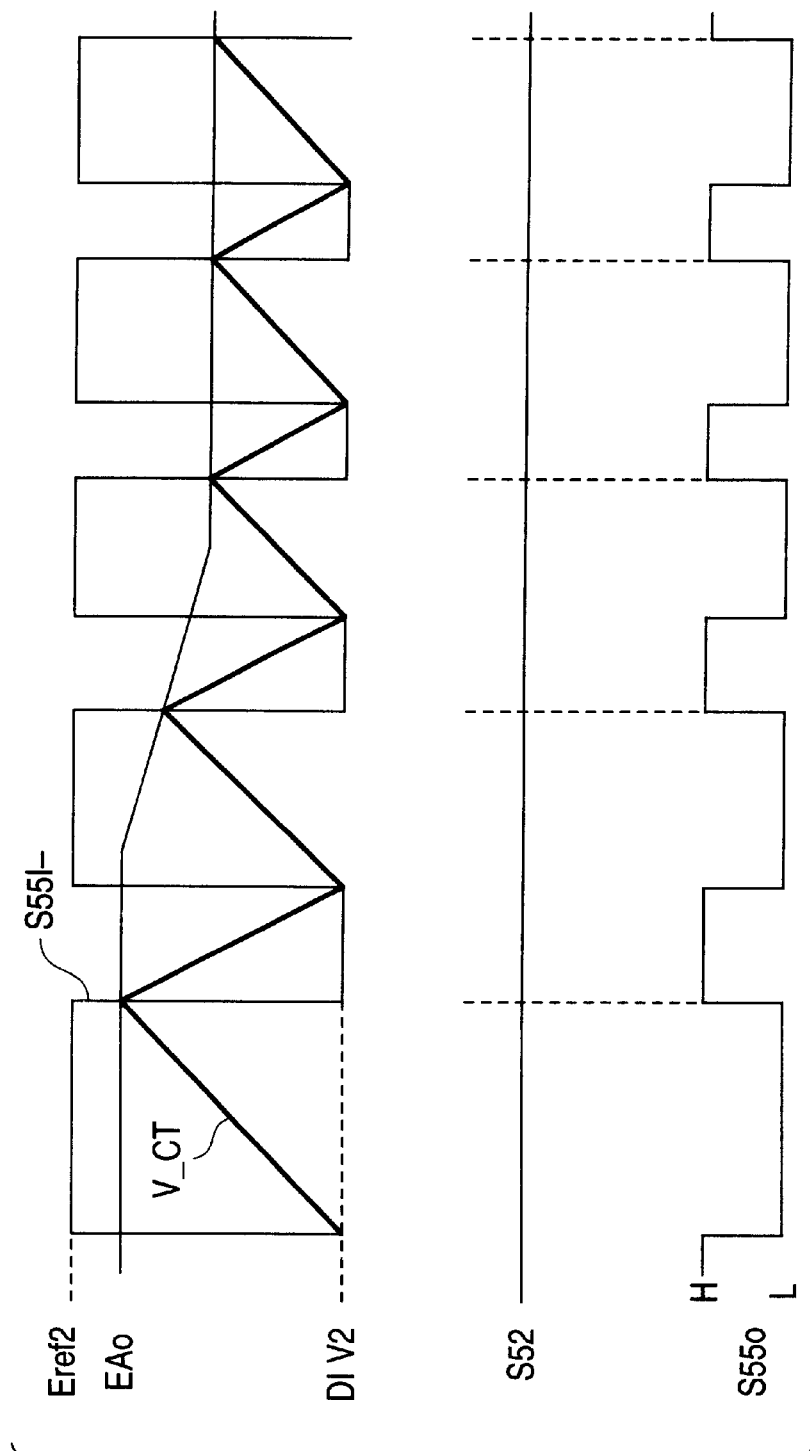
FIG. 21 is an exemplary circuit diagram showing a section of a circuit configuration for controlling activation/deactivation of a first switching element by changing a deactivated period and an activated period of the switching element.

FIG. 21 shows signals used in the modified circuit configuration. The signals have the same meanings as those mentioned previously.

In this configuration, after gradually dropping from a certain level, EAo reaches a predefined level. It can be seen that, in association with a decrease in EAo, the high-level period and low-level period of S55o become shorter.

Configurations (E) and (F) yield advantages of stabilizing energy distributed to discharge lamps. For instance, assume configuration (A) and the PWM control method are used when energy is supplied to two discharge lamps. If a flyback converter is used as a DC power supply circuit, the flux density of the transformer increases during the activated period of the first switching element SW1. During the deactivated period of the first switching element SW1, primary energy is transferred to the secondary sides of the transformer. If a difference exists between the secondary coils in terms of output voltage and power, a problem may arise in distribution of energy to the secondary outputs.

If power is supplied to the discharge lamps while the secondary outputs are switched by control of the second switching elements SW2_1 and SW2_2, the switching frequency is made constant by the PWM control method. Hence, greater power is distributed to a second switching element having a smaller duty cycle than to a second switching element having a greater duty cycle where the duty cycle represents the portion of the activated period of the second switching element in one cycle. This is ascribable to the fact that the flux density of the converter transformer is not made uniform to each of the secondary outputs.

In configurations (E) and (F), the circuit is not controlled while the switching frequency is maintained constant. The activated period of a switching element or the activated period and deactivated period of a switching element are controlled such that the flux density of the converter transformer is made substantially uniform, thereby enabling stable distribution of energy to the secondary outputs.

Figure 22:
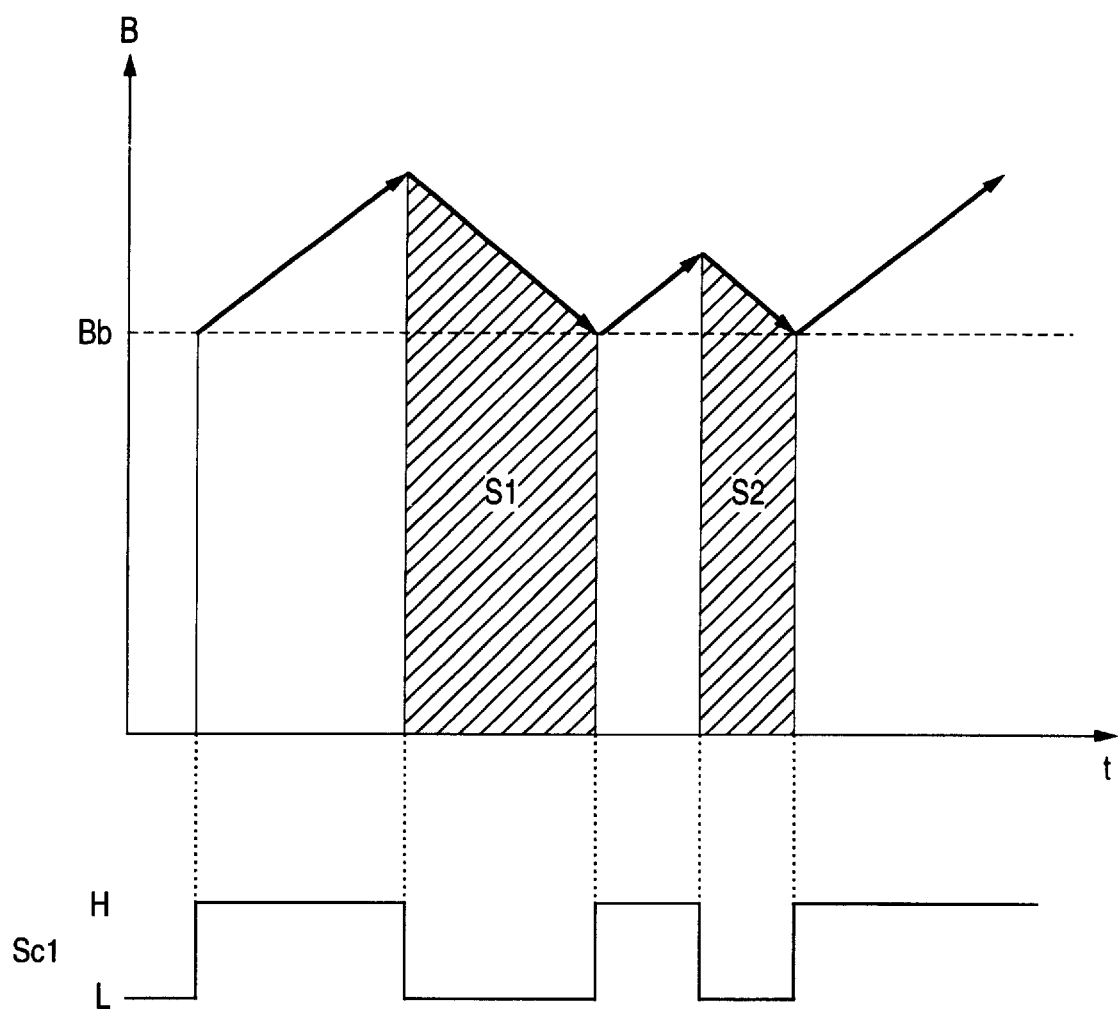
FIG. 22 is an exemplary circuit diagram showing a section of a circuit configuration for controlling activation/deactivation of a first switching element by changing either a deactivated period or an activated period of the switching element.

FIG. 22 schematically shows the status of the control circuit when configuration (F) is employed. The relationship between time and the flux density B of the converter transformer is plotted. The horizontal axis represents time and the vertical axis represents the flux density. The binary status of the control signal Sc1 to be sent to the first switching element is also provided below the graph.

As indicated by broken line Bb, the control signal Sc1 rises to a high level, that is, the first switching element SW1 is activated when the bottom ?level? of the flux density B becomes substantially constant and has reached a level Bb. The energy transferred to the secondary side of the converter transformer T for each operation corresponds to hatched areas S1 and S2. The hatched areas S1 and S2 correspond to low-level periods of the control signal Sc1. In this example, a high-level period arising chronologically ahead of a subsequent high-level period is longer, and the hatched area S1 arising in a low-level period subsequent to the longer high-level period accounts for a greater area than does the subsequent hatched area S2. In contrast, if the switching frequency is maintained constant, the area of the hatched area becomes greater for a smaller duty cycle.

Configurations (A) through (F) have been described by use of only two discharge lamps to make the circuit operation easy to understand. For N discharge lamps greater than two, the discharge-lamp illumination circuit can be generalized such that N second switching elements assigned to correspond to N discharge lamps are provided on the secondary circuit side of the converter transformer and such that distribution of primary energy to the respective discharge lamps is carried out by switchable control of the second switching elements.

According to the present invention, a plurality of secondary coils comprising a DC power supply circuit are provided, and voltages from the secondary coils can be controlled individually by means of the second switching elements. The DC power supply circuit is shared among a plurality of discharge lamps, thereby rendering the discharge-lamp illumination circuit compact. Further, the primary energy of the transformer is transferred to the secondary coils by means of the activation/deactivation of the second switching elements. Accordingly, distribution of power to the respective discharge lamps can be controlled, thereby gaining control according to the statuses of the discharge lamps or individual differences between the discharge lamps.

The present invention can prevent damage to a circuit element or breakage thereof, which would otherwise be caused by development of a high voltage in the transformer of the DC power supply circuit.

According to the present invention, when discharge lamps having substantially the same ratings are illuminated, power supply to the discharge lamps can be performed alternately. Little ripple arises in a voltage from the transformer, and alternation of the second switching elements involves substantially no power loss.

Power supply to a plurality of discharge lamps having different ratings can be controlled individually.

During a single operation of energy transfer from the primary-side circuit to the secondary-side circuit of the transformer, transfer of energy to the secondary outputs can be carried out substantially simultaneously or with a small time lag, by switching the respective statuses of the second switching elements.

The second switching elements whose activation/deactivation statuses are to be controlled enable control of energy transfer to the secondary outputs corresponding to the second switching elements, as well as energy transfer to the secondary output of the second switching element to be activated. Accordingly, alteration of the second switching elements involves substantially no power loss.

The activation and deactivation periods of the first switching element are controlled variably, thereby realizing stable distribution of energy to the secondary outputs of the transformer.

The present invention claims priority from Japanese patent application serial no. H2000-011968, which is incorporated herein by this reference in its entirety.

Other implementations are within the scope of the following claims.

What is claimed is:

1. A discharge-lamp illumination circuit comprising:
   a DC power supply circuit including a transformer and a first switching element connected to a primary coil of the transformer;
   a DC-AC conversion circuit for converting a voltage from a DC conversion circuit into an AC voltage and supplying the AC voltage to discharge lamps; and
   a control circuit for generating a control signal to control activation/deactivation of the first switching element to individually control the voltage from the DC power supply circuit supplied to each discharge lamp.

2. The discharge-lamp illumination circuit according to claim 1 further comprising:
   secondary coils in the transformer of the DC power supply circuit, the secondary coils equal in number to the discharge lamps;
   a second switching element whose activation or deactivation is controlled by a signal from the control circuit, separately provided on each of the secondary coils for the secondary coils to output different voltages.

3. The discharge-lamp illumination circuit according to claim 1 wherein when primary energy of the transformer of the DC power supply circuit is transferred to a secondary circuit, the control circuit transmits control signals to the respective second switching elements such that at least one of the second switching elements provided on the secondary coils is activated, and the primary energy is supplied from the secondary coil connected to the second switching element to a corresponding discharge lamp during the time the second switching element remains active.

4. The discharge-lamp illumination circuit according to claim 2 wherein during a single operation of energy transfer from a primary-side circuit to a secondary-side circuit of the transformer induced by controlling the activation/deactivation of the first switching element, the second switching elements are fixed to either an activated or deactivated status, and the activated/deactivated statuses of the second switching elements are reversed every time energy is transferred.

5. The discharge-lamp illumination circuit according to claim 2, wherein, during the course of energy transfer from a primary-side circuit to a secondary-side circuit of the transformer induced by controlling the activation/deactivation of the first switching element, the second switching elements are fixed to either an activated or deactivated status, and the activated/deactivated statuses of the second switching elements are reversed every time energy transfer is effected a predetermined number of times.

6. The discharge-lamp illumination circuit according to claim 2 wherein during a single operation of energy transfer from a primary-side circuit to a secondary-side circuit of the transformer induced by controlling the activation/deactivation of the first switching element, the second switching elements are switched from an activated state to a deactivated state, or vice versa.

7. The discharge-lamp illumination circuit according to claim 2 wherein during a single operation of energy transfer from a primary-side circuit to a secondary-side circuit of the transformer induced by controlling the activation/deactivation of the first switching element, some of the second switching elements are left in an activated state continually, and the other elements of the second switching elements are switched from an activated state to a deactivated state, or vice versa.

8. The discharge-lamp illumination circuit according to claim 2 wherein the activation/deactivation of the first switching element is controlled such that a deactivated period becomes constant and an activated period is changed.

9. The discharge-lamp illumination circuit according to claim 2 wherein the activation/deactivation of the first switching element is controlled such that a deactivated period and an activated period are both changed.

* * * * *